US009153914B2

(12) United States Patent
Weaver, Jr. et al.

(10) Patent No.: US 9,153,914 B2
(45) Date of Patent: Oct. 6, 2015

(54) POWER DEVICE HAVING MULTIPLE MODES OF OPERATION

(71) Applicant: Advanced Charging Technologies, LLC, Tulsa, OK (US)

(72) Inventors: W. J. "Jim" Weaver, Jr., Broken Arrow, OK (US); Michael H. Freeman, Tulsa, OK (US); Mitchael C. Freeman, Sapulpa, OK (US); Robert Dieter, Owasso, OK (US); Brian Santee, Tulsa, OK (US); Roy Matthew Milner, II, Broken Arrow, OK (US)

(73) Assignee: ADVANCED CHARGING TECHNOLOGIES, LLC, Tulsa, OK (US)

( * ) Notice: Subject to any disclaimer, the term of this patent is extended or adjusted under 35 U.S.C. 154(b) by 265 days.

(21) Appl. No.: 13/841,944

(22) Filed: Mar. 15, 2013

(65) Prior Publication Data

US 2014/0051292 A1  Feb. 20, 2014

Related U.S. Application Data

(63) Continuation-in-part of application No. 13/588,262, filed on Aug. 17, 2012.

(60) Provisional application No. 61/762,723, filed on Feb. 8, 2013.

(51) Int. Cl.
*H02B 1/00* (2006.01)
*H01R 13/66* (2006.01)
(Continued)

(52) U.S. Cl.
CPC .......... *H01R 13/6675* (2013.01); *H01R 31/065* (2013.01); *H02M 3/07* (2013.01); *H02M 3/3376* (2013.01); *H02M 3/33592* (2013.01); *H02M 1/08* (2013.01); *Y02B 70/1475* (2013.01)

(58) Field of Classification Search
USPC ............ 361/600, 679.01; 439/620.01, 620.21
See application file for complete search history.

(56) References Cited

U.S. PATENT DOCUMENTS 4,885,521 A * 12/1989 Crampton .................... 320/126
4,997,381 A    3/1991  Oh
(Continued)

FOREIGN PATENT DOCUMENTS

CA    2 431 689 A1   12/2004
DE    44 13 383 A1   10/1995
(Continued)

OTHER PUBLICATIONS

An introduction to LLC resonant half-bridge converter, ST Microelectronics, Sep. 2008, p. 1-64, retrieved from the Internet on Dec. 10, 2012 at http://www.resonant-converters.eu/st-an2644.pdf.
(Continued)

*Primary Examiner* — Thuy Vinh Tran
(74) *Attorney, Agent, or Firm* — Howard & Howard Attorneys PLLC

(57) ABSTRACT

A power device including a power circuit assembly, a first plug assembly, and a second plug assembly is described herein. The first plug assembly is coupled to the power circuit assembly for transmitting power from a power source to the power circuit assembly at a first voltage. The second plug assembly is coupled to the power circuit assembly for controllably transmitting power from the power source to the power circuit assembly at a second voltage and at a third voltage.

18 Claims, 20 Drawing Sheets

(51) Int. Cl.
*H01R 31/06* (2006.01)
*H02M 3/07* (2006.01)
*H02M 3/335* (2006.01)
*H02M 3/337* (2006.01)
*H02M 1/08* (2006.01)

(56) References Cited

U.S. PATENT DOCUMENTS

| | | | |
|---|---|---|---|
| 5,159,545 A | 10/1992 | Lee | |
| 5,641,311 A | 6/1997 | Chuang | |
| 6,134,125 A | 10/2000 | Wenzel | |
| 6,486,618 B1 | 11/2002 | Li | |
| 7,608,943 B2 * | 10/2009 | Sekai | 307/64 |
| 7,960,648 B2 * | 6/2011 | McGinley et al. | 174/36 |
| 8,334,483 B2 * | 12/2012 | Jaccard et al. | 219/442 |
| 8,436,584 B2 * | 5/2013 | Johnson et al. | 320/132 |
| 8,822,067 B2 * | 9/2014 | Johnson et al. | 429/161 |
| 2002/0113556 A1 | 8/2002 | Tao et al. | |
| 2004/0228070 A1 * | 11/2004 | Wang et al. | 361/600 |
| 2005/0162870 A1 | 7/2005 | Hirst | |
| 2007/0263366 A1 * | 11/2007 | Wu et al. | 361/752 |
| 2009/0034299 A1 | 2/2009 | Lev | |
| 2011/0021040 A1 * | 1/2011 | Garb et al. | 439/13 |
| 2011/0210833 A1 | 9/2011 | McNeely et al. | |
| 2012/0257333 A1 * | 10/2012 | Lee | 361/679.01 |

FOREIGN PATENT DOCUMENTS

| | | |
|---|---|---|
| EP | 0 398 722 A2 | 11/1990 |
| GB | 2 410 384 A | 7/2005 |
| JP | 2-123967 A | 5/1990 |

OTHER PUBLICATIONS

Patent Examination Report No. 1 (date of Issue Oct. 12, 2012).
International Search Report; Issue date: Sep. 16, 2014; PCT.
International Search Report and Written Opinion (PCT/US2013/055402)—Date of Mailing Mar. 25, 2014.

* cited by examiner

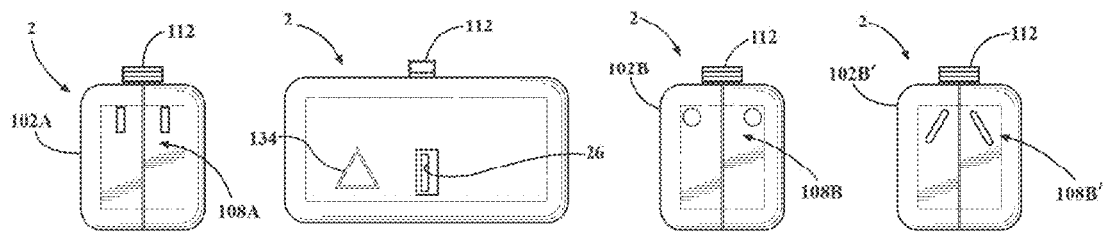
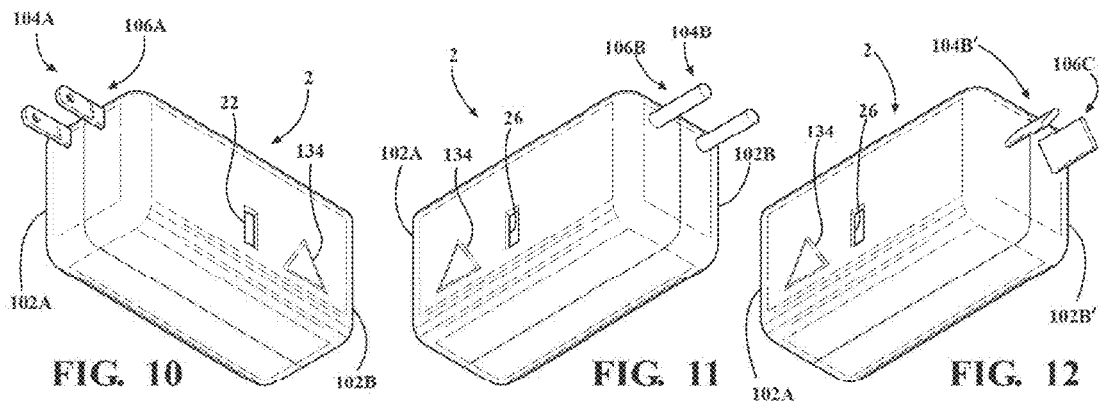

POWER DEVICE HAVING MULTIPLE MODES OF OPERATION

CROSS-REFERENCES TO RELATED APPLICATIONS

This application is a continuation-in-part of U.S. patent application Ser. No. 13/588,262, filed Aug. 17, 2012, and claims the benefit of U.S. Provisional Patent Application Ser. No. 61/762,723, filed on Feb. 8, 2013, all of which are incorporated herein by reference in their entirety for all purposes.

FIELD OF THE INVENTION

The present invention relates generally to power device circuits, and more particularly, to a power circuit which transforms electrical power utilizing a frequency dependent reactive device.

BACKGROUND OF THE INVENTION

The Energy Crises Requires Demand Side Response That Lowers Current Loads. The Energy Crisis is upon us worldwide. For instance, the U.S. Department of Energy predicts that by 2015 there will not, on the average, be enough electric power to supply average demand in the U.S.

One of the controllable offenders is "Vampire Loads". Also call "Wall Wort Power" or "Standby Power" this electricity waste makes up a large portion of homes' or offices' miscellaneous electric load and is a large waste of power. Vampire Load producers includes cell phone chargers, lap top chargers, notebook chargers, calculator chargers, small appliances, and other battery powered consumer devices.

The U.S. Department of Energy said in 2008:

"Many appliances continue to draw a small amount of power when they are switched off. These "phantom" loads occur in most appliances that use electricity, such as VCRs, televisions, stereos, computers, and kitchen appliances. This can be avoided by unplugging the appliance or using a power strip and using the switch on the power strip to cut all power to the appliance."

According to the U.S. Department of Energy, the following types of devices consume standby power:

1. Transformers for voltage conversion. (Including cell phone, lap top and notepad, calculators and other battery powered devices that use wall chargers).
2. Wall wart power supplies powering devices which are switched off. (Including cell phone, lap top and notepad, calculator, battery powered drills and tools, all of which have wall chargers and have either completely charged the batteries or are actually disconnected from the device).
3. Many devices with "instant-on" functions which respond immediately to user action without warm-up delay.
4. Electronic and electrical devices in standby mode which can be woken by a remote control, e.g. some air conditioners, audio-visual equipment such as a television receiver.
5. Electronic and electrical device which can carry out some functions even when switched off, e.g. with an electrically powered timer. Most modern computers consume standby power, allowing them to be woken remotely (by Wake on LAN, etc.) or at a specified time. These functions are always enabled even if not needed; power can be saved by disconnecting from mains (sometimes by a switch on the back), but only if functionality is not needed.
6. Uninterruptible power supplies (UPS)

All this means that even when a cell phone, lap top or like device is completely charged, current is still flowing, but not accomplishing anything and wasting electricity. Most recently manufactured devices and appliances continue to draw current all day, every day—and cost you money and add to the Energy Crisis Worldwide.

The National Institute of Standards and Technology (NIST) (a division of the U.S. Department of Commerce) through its Buildings Technology Research and Development Subcommittee in 2010 stated its goals for reducing "plug loads," stating:

"The impact of plug loads on overall consumption is quite significant. For commercial buildings, plug loads are estimated at 35% of total energy use, for residential 25%, and for schools 10%.

Opportunities for lowering plug loads include:
1) more efficient plugged devices and appliances,
2) automated switching devices that turn off unused appliances and reduce "vampire" loads from transformers and other small but always on appliances, or
3) modifying occupant behaviors."

The present invention is aimed at one or more of the problems identified above to provide better efficiencies.

SUMMARY OF THE INVENTION

In one aspect of the present invention, a power device is provided. The power device includes a power circuit assembly, a first plug assembly, and a second plug assembly. The first plug assembly is coupled to the power circuit assembly for transmitting power from a power source to the power circuit assembly at a first voltage. The second plug assembly is coupled to the power circuit assembly for controllably transmitting power from the power source to the power circuit assembly at a second voltage and at a third voltage.

In another aspect of the present invention, a power device is provided. The power device includes a housing, a power circuit assembly, a first plug assembly, and a second plug assembly. The housing includes an outer surface and an inner surface that defines a cavity therein. The power circuit assembly is positioned with the housing cavity. The first plug assembly is pivotably coupled to the housing and is configured to transmit power from a power source to the power circuit assembly at a first voltage. The second plug assembly is pivotably coupled to the housing and is configured to transmit power from the power source to the power circuit assembly at a second voltage and at a third voltage.

This invention works for both battery powered devices and direct powered devices. With a communication chip included in the SmartProng™ Technology Plug/cord, powered appliances can receive a command to shut-off the appliance/device at certain times (usually designated as "Demand Response" times by the Electrical Utility) and thus cover the entire plug load market with added energy efficiency.

Many similar existing electronic devices use a "Post-Regulation System" which extracts the exact power flow from a wall outlet then modifies it to an approximately desired AC voltage, usually through the use of a transformer, which is then converted to pulsating DC through the use of a rectifying system (usually in a circuit board), commonly through the use of a full wave bridge. Then an electrolytic capacitor is used to provide an unregulated DC voltage. Finally, a linear regulator device is used to provide the desired regulated DC power.

Because the regulator is at the end of this chain, this is described herein a as a "Post-Regulation System." All of the parts in the chain provide losses which come in the form of heat and waste of electricity (loss). In the Post-Regulation Systems, the largest loss typically comes from the linear regulator followed closely by the transformer.

This invention is a method for a design and utility patent for "Pre-Regulating" power current loads for devices which makes transformers obsolete, and regulating battery fulfillment, turning-off power when the battery is full and saving wasted energy.

One way to replace the transformer in such a system is through capacitor drop technology which is described herein. This process hinges on a capacitor's ability to pass an AC voltage that diminishes with frequency. For a given frequency, such as 60 cycle AC, it is possible to select a value that will deliver a desired AC output for a given load. This characteristic is similar to a valve in a water pipe. Because of this mode of action, this process is almost lossless.

In the current invention, the capacitors are used on the circuit board instead of a transformer.

The present invention utilizes capacitor drop technology, by housing it in or connected directly to the plug prong or prongs, which are then plugged into and AC outlet, makes the prongs themselves one or more capacitors. One advantage is that the voltage leaving the outlet socket is limited right from the start. This conserves energy and makes the SmartProng Plug safer. Thus safety and efficiency are embodied in a new and unique way into the same product. The miniature capacitors which are either embedded into one or more prongs or are connected to one or more prongs and housed in the plug can have a fixed value, like a plug that only delivers 5 volts AC at 1 Amp which would be the 5 watts needed to charge a cell phone. Or a fixed value could deliver 10 volts AC at 2 Amps for the 12 watts needed to power an iPad or similar notebook. Alternatively, the capacitance can be housed on the circuit board, replacing the need for the transformer and linear regulator combination.

In this configuration just the fixed capacitance could be utilized, or a chip, like Maxim's MAX8971 could be integrated with the SmartProng circuitry to create intelligence that would sense when the battery is full and disconnect the prong(s) capacitor from the AC outlet, thus shutting off the Vampire Load.

The current invention uses an embedded processor which controls the process. This processor could also contain or be coupled with a carrier current system (communication over power lines) or wireless communication chip which would enable remote operation by the powered device or other remote system.

The invention modifies and controls the capacitance of a capacitor drop system, and eliminates the need for the transformer linear regulator combination at the end of the chain. Instead, it controls the amount of current (amp×volts) that exits by frequency modulation.

As such, the capacitor charging technology is a very efficient because the two most heat producing and wasteful portions of the chain, i.e. the transformer and the linear regulators, are eliminated altogether. Moreover, many external charging devices provide less (700-800 mA) than the 1 A needed to adequately charge a phone, much less the 2.4 A needed to charge and run (while charging) devices like a tablet (i.e. a Samsung Galaxy or an iPad) or the 9.2 A needed to charge and/or run a notebook or laptop. The current invention can alter the voltage and amp outputs to be able to either charge one or more cell phones, or one or more tablets, or one or more notebooks/laptops, or alternatively one or more cell phones and one or more tablet, notebooks, and or laptops. All charging combinations of cell phones, tablets, notebooks, and/or laptops are possible. The current invention's software and microprocessor recognizes through its logic in the microprocessor the draw from the battery as connected and analyzes the ramp up draw from that battery and then either sends 1 A (for charging a cell phone) or up to 2.4 A for devices like a tablet; or up to 9.2 A for charging a notebook or laptop, which the current invention can either do alternatively or at the same time. In one embodiment, the acceptable input voltage can range from a low of 85V-a high of 300V worldwide. Output voltage is device dependent but 5V to 19V are possible.

BRIEF DESCRIPTION OF THE DRAWINGS

Other advantages of the present invention will be readily appreciated as the same becomes better understood by reference to the following detailed description when considered in connection with the accompanying drawings wherein:

FIG. 3 is an isometric drawing of a first view of a power circuit having a housing, according to an embodiment of the present invention;

FIG. 4 is an isometric drawing of a second view of the housing of FIG. 3;

FIG. 5 is an isometric drawing of an alternative power circuit housing;

FIG. 6 is an isometric drawing of a side view of the housing of FIG. 3;

FIG. 7 is an isometric drawing of a second side view of the housing of FIG. 3;

FIG. 8 is an isometric drawing of an opposite side view of the housing of FIG. 3;

FIG. 9 is an isometric drawing of an opposite side view of the alternative power circuit housing;

FIG. 10 is another isometric drawing of the housing of FIG. 3;

FIG. 11 is a further isometric drawing of the housing of FIG. 3;

FIG. 12 is an isometric drawing of the alternative power circuit housing;

Corresponding reference characters indicate corresponding parts throughout the drawings.

DETAILED DESCRIPTION OF INVENTION

Figure 1:
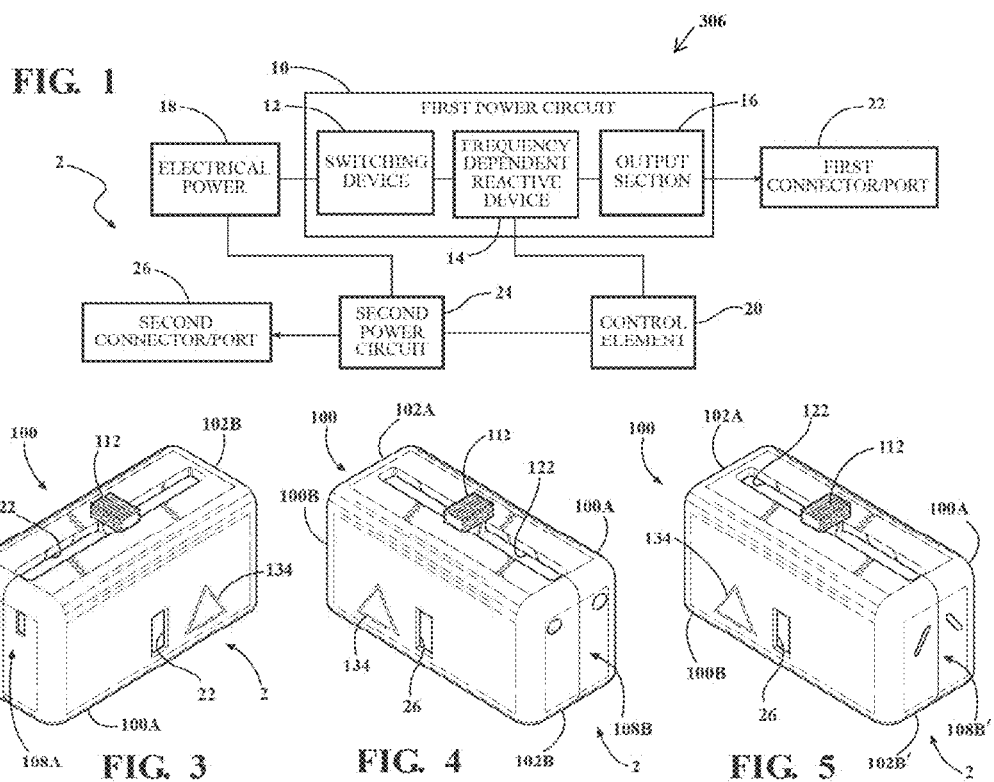
FIG. 1 is a block diagram of a power circuit for use, for example, in a power supply, according to an embodiment of the present invention.

Referring to the Figures, wherein like numerals indicate like or corresponding parts throughout the several views, a power device 2 having a first power circuit 10 is provided. As shown in FIG. 1, the first power circuit 10 includes a switching device 12, a frequency dependent reactive device 14 and an output section 16.

The first power circuit 10 may be used to convert the power provided by a source of electrical power of a first type to electrical power of a more desirable type. For example, the first power circuit 10 may be used to convert electrical power received from a source of electrical power 18, such as a power grid. The source of electrical power 18 may be provided as an alternating current at a given voltage, e.g., 120 volts at a frequency of 60 Hertz (the North American Standard) or 220-240 volts at a frequency of 50 Hz (the European Standard) to a more desirable voltage. The acceptable input voltage range for the invention is a low of 85 volts to a high of 300 volts at either 50 or 60 Hertz so as to accept a world-wide range of mains power. The output electrical power, at the desired voltage, may be supplied at a direct current, such as 5 volts direct current (VDC) or an AC signal of any desirable waveform.

In one aspect, the first power circuit 10 of the present invention provides a power supply circuit which replaces the transformer of prior art power supplies with the in-line frequency dependent reactive device 14. As discussed more fully below, the frequency dependent reactive device 14, in general, passes an alternating current whose voltage level changes with frequency. In other words the frequency dependent reactive device 14 passes current at varying efficiency which is dependent on frequency. By proper value selection the capacitor can allow a lossless voltage drop. Therefore, the power circuit 10 avoids the inefficiencies of the standard power supply circuit which includes a transformer. The inefficiencies of the prior art transformer based circuits are typically exhibited, at least in part, as excess generated heat.

Returning to FIG. 1, the switching device 12 is coupled to the source of electrical power 18. The switching device 12 is adapted to receive a control signal and to produce an alternating current power signal. The frequency of the alternating current power signal is responsive to the control signal.

As explained more fully below, the control signal is generated by a control element 20 (which may be microprocessor based). In one embodiment, the control signal is a variable frequency. The frequency of the control signal is modified to deliver the desired output power.

The frequency dependent reactive device 14 is electrically coupled to the switching device 12 and receives the alternating current power signal and produces an alternating current output power signal having a reduced voltage level. The frequency dependent reactive device is chosen to achieve a desired voltage of the output power signal relative to the alternating current power delivered by switching device 12.

Returning to FIG. 1, the first power circuit 10 may provide electrical power from the output section 16 through an appropriate power connector or port 22, such as a universal serial bus (USB) port. In the illustrated embodiment, the power device 2 includes a second power circuit 24, which is electrically coupled to the control element 20, and provides output power through a second power connector or port 26. In one embodiment, the second power circuit 24 is similar or identical to the first power circuit 10.

Figure 2:
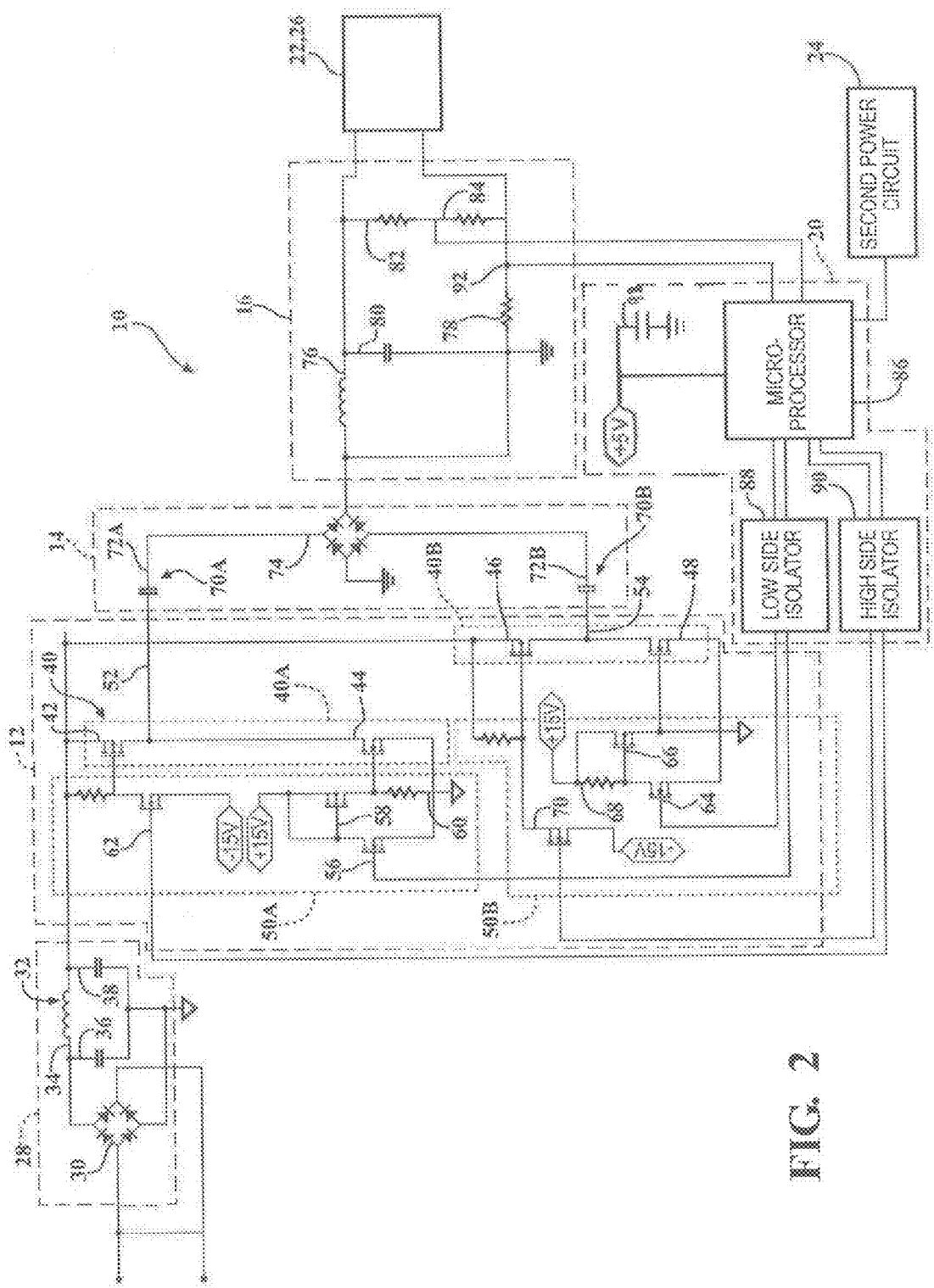
FIG. 2 is a schematic of the power circuit of FIG. 1, according to an embodiment of the present invention.

A first embodiment of the first power circuit 10 is shown in FIG. 2. The first power circuit 10 includes an input or rectifying circuit 28. The input circuit 28 is electrically coupled to the source of electrical power 18. The input circuit 28 converts the input electrical power to a DC voltage at a voltage dependent upon the input power. For example, in one embodiment the input power is 120 volts at 60 Hz, and the input circuit 28 converts the input power to approximately 180 volts (DC).

In the illustrated embodiment, the input circuit 28 includes a first full-wave bridge rectifier 30 having first and second input terminals coupled to the high and low sides of the source of electrical power 18. The output terminals of the first full-wave bridge rectifier 30 are coupled to a circuit which includes an inductor 32. The ends of the inductor 32 are electrically coupled to ground through first and second capacitors 36, 38, respectively. The full-wave rectified output of the full-wave bridge rectifier 30 is converted into a DC voltage signal at, e.g., approximately 180 volts by this circuit.

The switching device 12 receives a control signal from the control element 20 and converts the DC voltage output of the input circuit 28 into an alternating current power signal. The frequency of the alternating current power signal is responsive to the control signal.

In one embodiment, the switching device includes a first pair of transistors 40A and a second pair of transistors 40B, both pairs 40A, 40B are arranged in a totem pole arrangement.

In the illustrated embodiment, the first pair of transistors 40A includes a first P-channel MOSFET transistor 42 and a first N-channel MOSFET transistor 44. The second pair of transistors 40B includes a second P-channel MOSFET transistor 46 and a second N-channel MOSFET transistor 48.

Each pair of transistors 40A, 40B is driven by first and second driver circuits 50A, 50B. The driver circuits 50A, 50B are electrically coupled to the control element 20. The driver circuits 50A, 50B receive the control signal and deliver a driver signal to the respective pair of transistors, 40A, 40B.

The first pair of transistors 40A drive the highside 52 of the output of the switching circuit 12 and the second pair of transistors 40B drive the lowside 54 of the output of the switching circuit 12. The output of the first and second pairs of transistors 40A, 40B are 180 degrees out of phase with respect to each other. In other words, when the highside 52 of the output of the switching circuit is high, the lowside 54 of the output of the switching circuit is low. And when the highside 52 of the output switching circuit is low, the lowside 54 of the output of the switching circuit 12 is high.

In the illustrated embodiment, the first driver circuit 50A includes a third N-channel MOSFET transistor 56 coupled to the control element 20, a third P-channel MOSFET transistor 58 coupled to the third N-channel MOSFET transistor 56 and a resistor 60 coupled between the third P-channel MOSFET transistor 58 and ground. The first driver circuit 50A also includes a fourth N-channel MOSFET transistor 62 coupled between the control element 20 and the first P-channel MOSFET transistor 42.

In the illustrated embodiment, the second driver circuit 50B includes a fifth N-channel MOSFET transistor 64 coupled to the control element 20, a fourth P-channel MOSFET transistor 66 coupled to the fifth N-channel MOSFET transistor 64 and a resistor 68 coupled between the fourth P-channel MOSFET transistor 66 and a positive rail voltage, e.g., +15 volts. The second driver circuit 50B also includes a sixth N-channel MOSFET transistor 68 coupled between the control element 20 and the second P-channel MOSFET transistor 46.

In the illustrated embodiment, each pair of transistors 40A, 40B consist of a P-channel MOSFET 42, 46 in a highside configuration over a N-channel MOSFET 44, 48 in a totem pole configuration. In this embodiment, the square wave outputs of the driver circuits 50A, 50B are in phase, but offset as to the DC level.

In an alternative embodiment, the first and second driver circuits 50A, 50B (and isolators 88, 90) may be replaced by integrated circuit (IC) drivers. Additionally, each pair of transistors 40A, 40B may be replaced by a pair of N-channel transistors in a totem pole configuration. In this arrangement, the square wave outputs of the IC drivers are 180 degrees out of phase.

The frequency dependent reactive device 14 includes at least one pair of reactive element like 70A, 70B in the illustrated embodiment. Since both the highside 52 and the lowside 54 are driven, the frequency dependent reactive device 14 includes first and second reactive elements 70A, 70B. In the illustrated embodiment, the first and second reactive elements 70A, 70B are capacitors 72A, 72B. The capacitors 72A, 72B may be nano-capacitors, and may be based upon ferroelectric and core-shell materials as well as those based on nanowires, nanopillars, nanotubes, and nanoporous materials.

In practice, the frequency of the control signal from the control element 20 controls the frequency of the alternating current power signal. For example, generally the switching circuit 14 creates an alternating current having a peak voltage based on the output voltage of the input circuit 28 and having a frequency based on the control signal. Since the value of the capacitors 72A, 72B are chosen based on the frequency of the alternating current power signal, the amount of power utilized from the source of electrical power 18, and thus, the efficiency of the power circuit 10, 24 can be controlled.

In one embodiment, the output power signal is a DC voltage at a target voltage, e.g., 5 volts. As shown in FIG. 2, the frequency dependent reactive device 14 may also include a second full-wave rectifier 74 to transform the alternating current signal from the capacitors 72A, 72B into a DC voltage.

The output subsection 16 of the power circuit 10 includes filters, and conditions the output of the switching circuit 14. The output section 16 includes an inductor 76 and a capacitor 80.

The output section 16 also includes a voltage divider, comprised of resistors 82, 84. The output of the voltage divider is fed to the control element 20 (see below).

In the illustrated embodiment, the control element 20 includes a microprocessor 86 and a lowside isolator 88 and a highside isolator 90.

The two highside isolator outputs are 180 degrees out of phase with each other. The two lowside isolator outputs are also 180 degrees out of phase with each other. The isolators 88, 90 disassociate the devices being charged from the source of electrical power 18. The purpose of this isolation is to eliminate shock hazards to the user.

Using the voltage divider circuit 82, 84, the control element 20, i.e., the microprocessor 86 can sense the actual voltage delivered (which can vary based on, e.g., manufacturing tolerances in the circuit components). The voltage output of the voltage divider circuit 82, 84 is input to an A/D input of the microprocessor 86. The control element 20 can also sense the current being delivered through sense resistor 78. Based on the sensed voltage and current delivered, the control element 20 can modify the frequency of the control signal to fine tune and more accurately control the output of the power circuit 10.

In one aspect of the present invention, the microprocessor 86 or control element 20 monitors the output power signal (through the voltage divider circuit 82, 84) and adjusts the control signals to the switching device 12 and the frequency dependent reactive device 14 to keep the power output within specification. The control element 20 includes the microprocessor 86 and an associated control program. The output of the voltage divider circuit 82, 84 is used to calculate/modify the frequency of the output signal(s), i.e., the frequency is increased if more voltage is required and lower if less voltage is required.

The control program may compensate for different output load conditions, component tolerances, component parameter variations at different operating points, and component changes due to temperature. The control program also monitors several operating parameters to turn the switching device off, which removes power from the output, if a condition that is unsafe or out of the operating range is detected.

In general, the control loop monitors the output power signal and adjusts the frequency of the switching device to make the output power signal stay within its operating limits. The control loop uses the nominal characteristics of the frequency dependent reactive element 14 for control decisions. For example, if the output power signal is below the operating limit, the frequency is changed to deliver more power to the output. The control loop performs other tasks like: a slow startup sequence to keep from overpowering an attached load, and fault monitoring and handling.

In one aspect of the present invention, the impedance of capacitors 72A, 72B can be represented as ideal capacitors defined as:

$$Z = \frac{1}{2\pi f C},$$

Where f represents the frequency of the control signal in Hertz and C is the value of the capacitor in Farads. Since the value of the impedance is inversely proportional to the frequency used, a capacitor value is selected that will produce the lowest required impedance at the highest desirable signal frequency. In the present invention, the lowest possible impedance is desired with the lowest possible input voltage ($V_i$), highest current load ($I_{max}$), and maximum acceptable switching frequency ($f_{max}$).

The purpose of the capacitors 72A, 72B are to supply the secondary with an attenuated voltage source with which the secondary side will further regulate to the desired output. The signal applied to the capacitor, Vi, minus the desired voltage on the secondary side $V_s$ is equal to the voltage attenuation of the capacitors 72A, 72B. The current through each capacitor 72A, 72B is equal to the current demanded by the load on the secondary. The desired Z of the capacitor is found using the following equation:

$$Z = \frac{(V_i - V_s)}{I_{max}}.$$

The proper value of the capacitor can be calculated using the ideal capacitor equation using Z and $f_{max}$.

The capacitor value gives the total attenuation capacitance needed. If full isolation is required, then two capacitors are used to isolate both sides of the AC signal. These two capacitors will be in a series connection, and capacitors in series add in this relationship:

$$C = \left(\frac{1}{C_a} + \frac{1}{C_b} \cdots \frac{1}{C_n}\right)^{-1}$$

For balancing of the circuit the two constituent capacitors $C_c$ are of equal value. Therefore, $$C = \left(\frac{1}{C_c} + \frac{1}{C_c}\right)^{-1} = \frac{C_c}{2},$$

and $$C_c = 2 * C.$$

The value of $C_c$ is the value of the actual components placed in the circuit.

With reference to FIGS. 4-16, in one embodiment of the present invention, the power device 2 is contained within a housing 100. In the illustrated embodiment, the housing 100 is comprised of a pair of half shells (first and second half-shells 100A, 100B) which form a cavity in which the power device 2 is located. The pair of half shells 100A, 100B may be held together by clips, an adhesive, or fasteners, any suitable fastening means, and the like, or combinations thereof. In the illustrated embodiment, the power device 2 includes two power circuits 10, 24 which provide power to the first and second ports 22, 26 which are shown as USB ports which are located on the first and second half-shells 100A, 100B, respectively. It should be noted that while in the illustrated embodiment, two USB ports are shown, it should be recognized that either more or less ports may be provided, and may be either based on a USB standard or other standards and connectors, like that used in notebooks and laptops.

The housing 100 has a first end 102A and a second end 102B. Each end 102A, 102B may controllably form an electrical plug 104A, 104B. The electrical plugs 104A, 104B may conform to different international standards. For example, in FIG. 10, the first electrical plug 104A is a North American standard plug formed by the first end 102A and a first pair of prongs 106A and the second electrical plug 104B is a European standard plug formed by the second end 102B and a second pair of prongs 106B. With respect to FIG. 12, either plug may be configured to meet any other standard such as the Australian standard (formed by the alternative end 104B' and the alternative prongs 106C).

In practice, the device 2 has three modes: a storage mode, a first mode, and a second mode. In the storage mode, both sets of prongs 106A, 106B, 106C are contained within the housing 100 (as shown in FIG. 3-9).

In the first mode, the prongs 106A comprising the first electrical plug 104A are extended through a first set of apertures 108A in the first end 102A (see FIG. 10)

In the second mode, the prongs 106B, 106C comprising the second electrical plug 104B, 104B' are extended though a second set of apertures 108B, 108B' in the second end 102B, 102B' (see FIGS. 11 and 12).

With respect to FIGS. 3-9, 13, and 15, the power device 2 includes actuation device 110. The actuation device 110 includes a button 112, a prong receiving apparatus 114, and a dust cover 116. The prong receiving apparatus 114 includes first and second slots which receive first and second double ended prong structures 118, 120. Each double ended prong structure 118, 120 forms one of the pairs of each set of prongs, as shown. The prong structures 118, 120 are electrically coupled to the first and second power circuits 10, 24.

The button 112 is affixed or formed on an opposite side of the dust cover 116. The button 112 extends through, and is movable along, a slot 122 formed in the housing 100. Actuation of the button 112 in either direction along the slot 122 extends one of the pairs of prongs 106A, 106B, 106C through the respective apertures 108A, 108B, 108B'.

Figure 13:
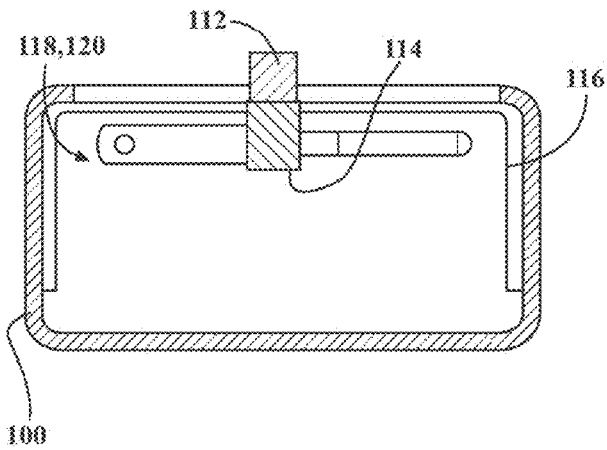
FIG. 13 is a cutaway drawing of the power circuit housing of FIG. 3.

As shown in FIG. 13, the dust cover 114 wraps around the inner surface of the housing 100. The lower portions 124 of the dust cover 114 covers or blocks the apertures to prevent or minimize entry of dust and other contaminants into the housing 100. As the button 112 is manipulated towards one end of the slot 122, the respective prongs 106A, 106B, 106C are moved towards and extend through the apertures 108A, 108B, 108C. At the same time, the dust cover 110 is also moved. A respective upper portion 126 of the dust cover 110 is moved towards the respective apertures 108A, 108B, 108C such that a respective set of apertures 128, 130 in the dust cover are generally aligned with the apertures, thereby allowing the prongs 106A, 106C, 106C to pass therethrough.

Figure 14:
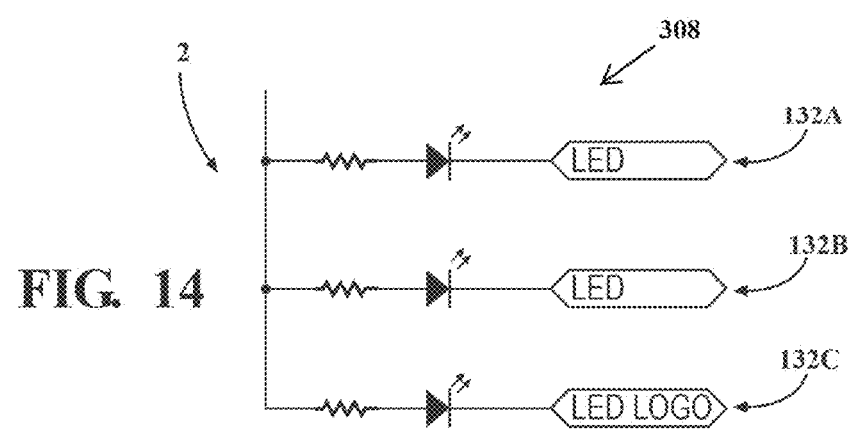
FIG. 14 is a schematic of a LED circuit, according to an embodiment of the present invention.
Figure 15:
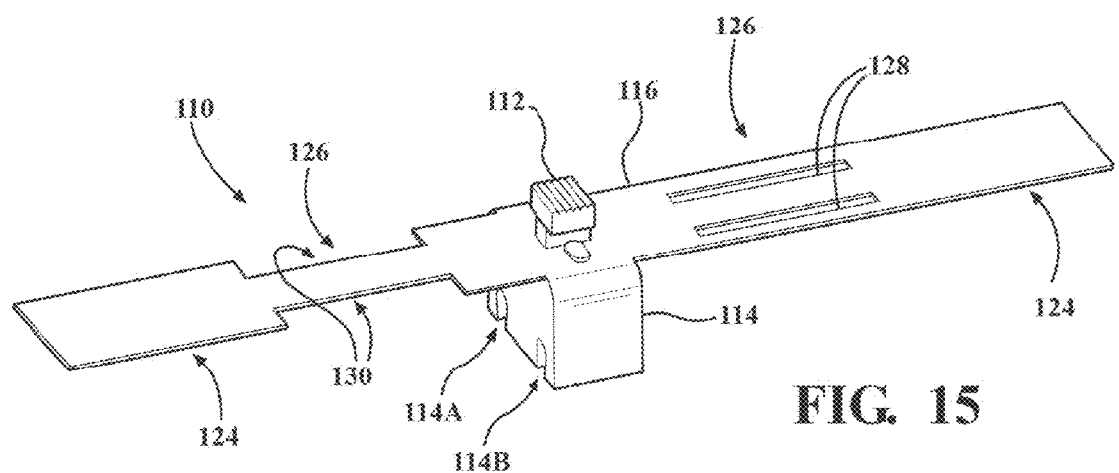
FIG. 15 is a drawing of a dust shield associated with the housing of FIG. 3, according to an embodiment of the present invention.
Figure 16:
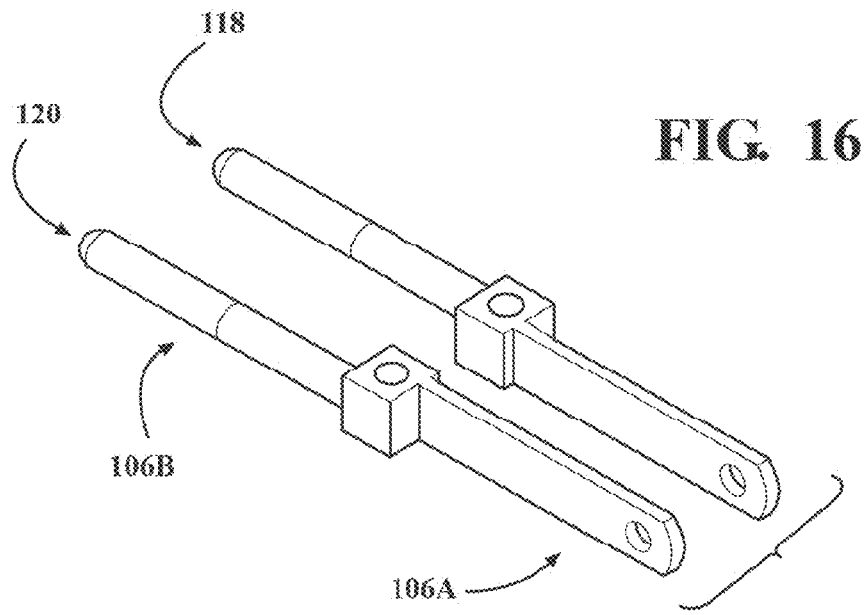
FIG. 16 is an illustration of a prong element for use with the dust shield of FIG. 15.

With reference to FIG. 14, in one embodiment the power circuits 10, 24 includes three separate LED circuits 132A, 132B, 132C (each comprising a resistor in series with a LED, as shown). The first and second LED circuits 132A, 132B are used to illuminate the first and second USB ports 22, 26, respectively. The third LED circuit 132C is located behind a logo 134 located on each side of the housing 100.

Lighting of the logos 134 using the third LED circuit 132C, in one embodiment, is used to power is being applied to the device being power or charged through one of the ports. Lighting of the ports may be used to confirm that the attached device (not shown) is being charged. A pulsing scheme may be implemented in order to communicate the current relevant state of charge. For example, the LED (for the respective USB port) may be rapidly pulsed when the device being charged is in a low state of charge with the pulse rate diminishing as the device approaches full charge.

Figure 17:
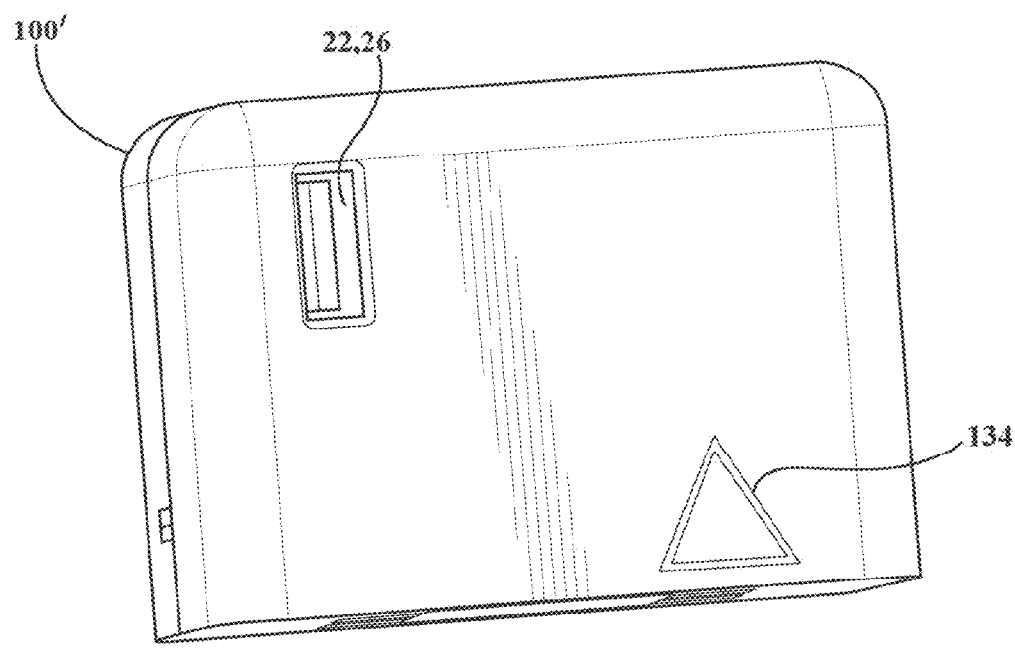
FIG. 17 is a first view of an alternative housing for use with the power circuit, according to an embodiment of the present invention.
Figure 18:
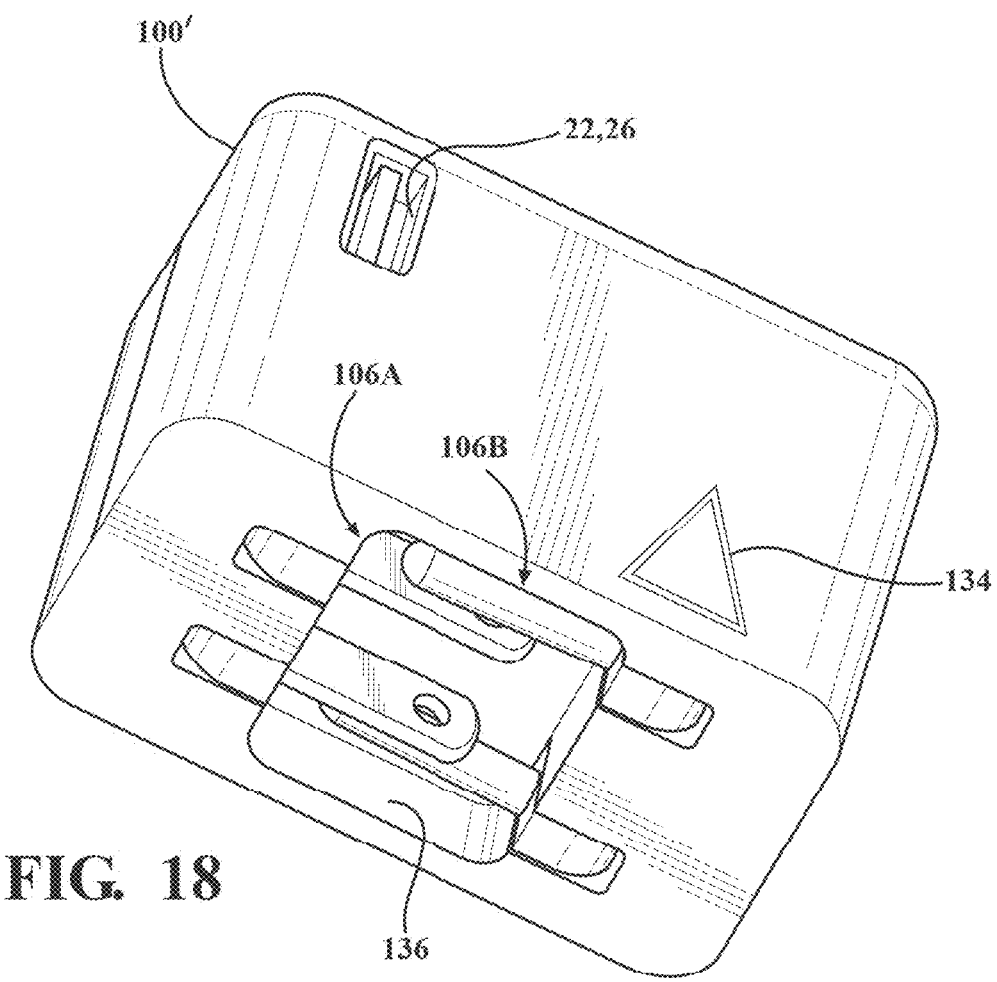
FIG. 18 is a second view of the alternative housing of FIG. 17.

With reference to FIGS. 17 and 18, an alternative embodiment of the housing 100' is shown. The alternative housing 100' includes first and second USB ports 22, 26 (located on opposite sides thereof) and a logo 134. Separate pairs of prongs 106A, 106B are rotatably coupled to the housing 100' and electrically coupled to the power device 2.

Figure 20:
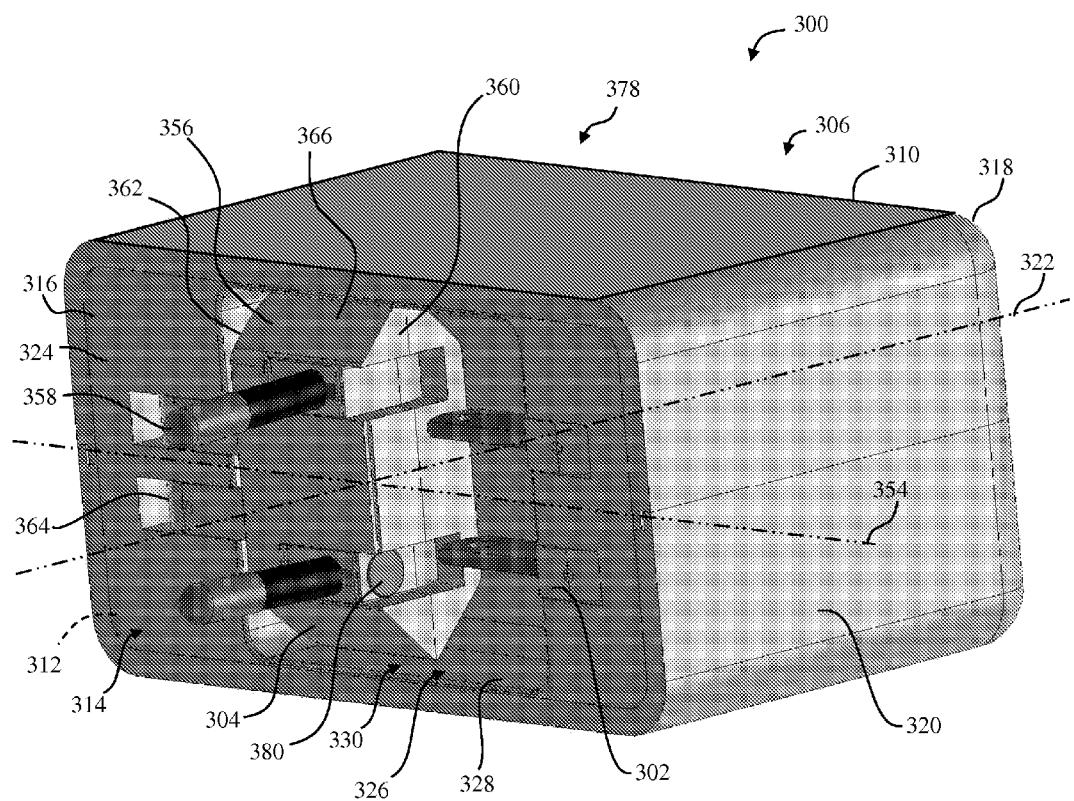
FIG. 20 is an isometric view of an alternative housing for use with the power circuit shown in FIG. 1, according to an embodiment of the present invention.
Figure 21:
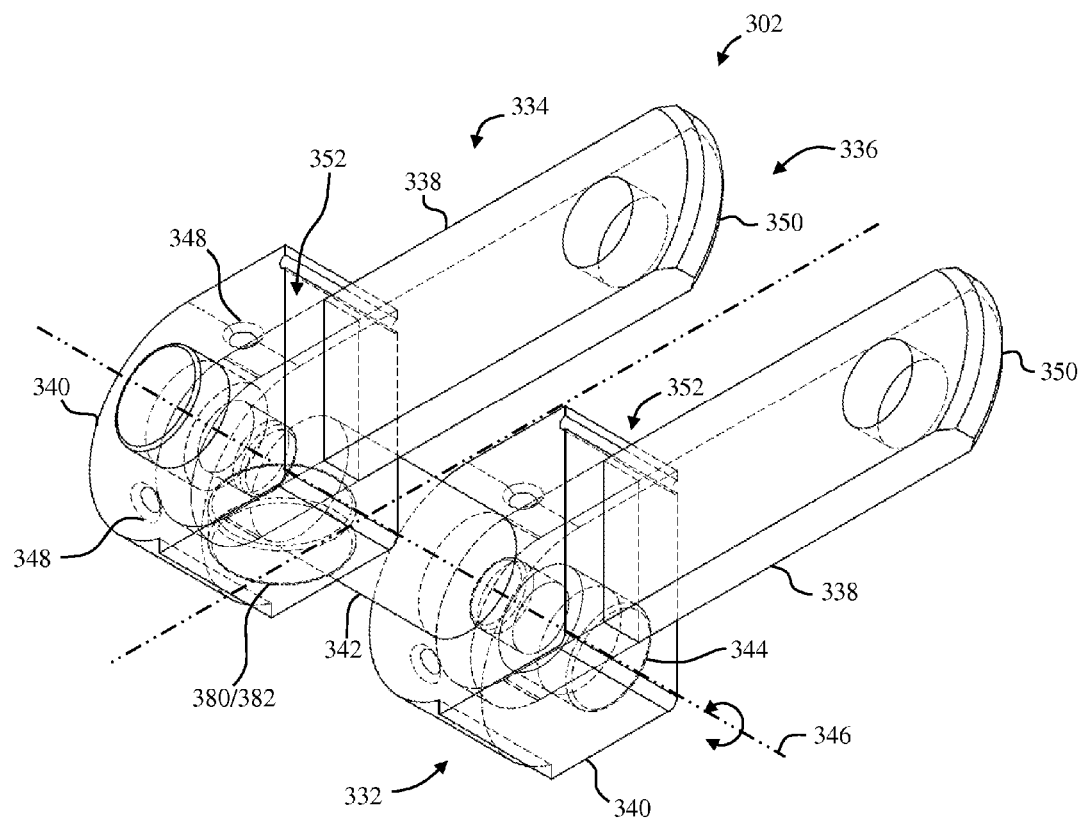
FIG. 21 is a schematic isometric view of a first plug assembly for use with the housing shown in FIG. 20, according to an embodiment of the present invention.
Figure 22:
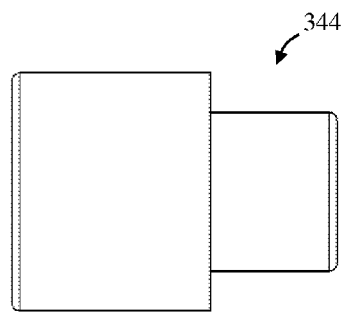
FIG. 22 is a side view of a portion of the first plug assembly shown in FIG. 21.
Figure 23:
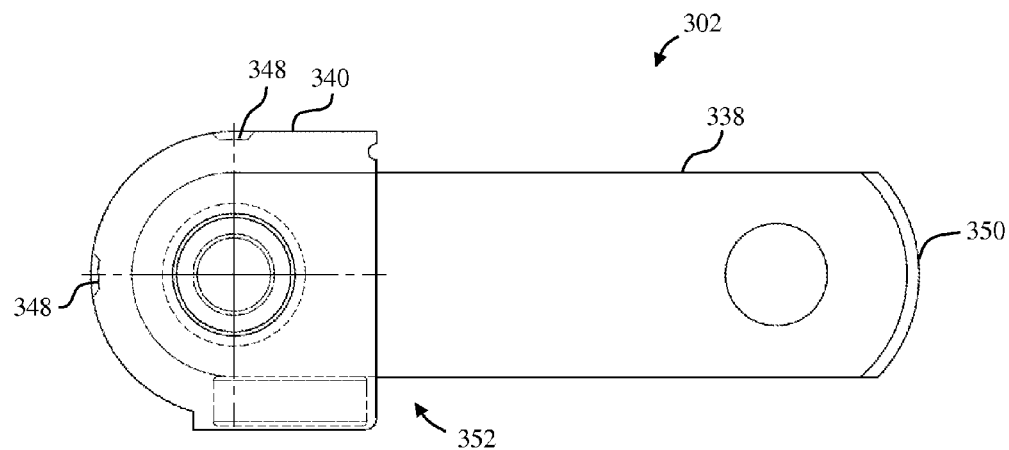
FIG. 23 is a side view of the first plug assembly shown in FIG. 21.
Figure 24:
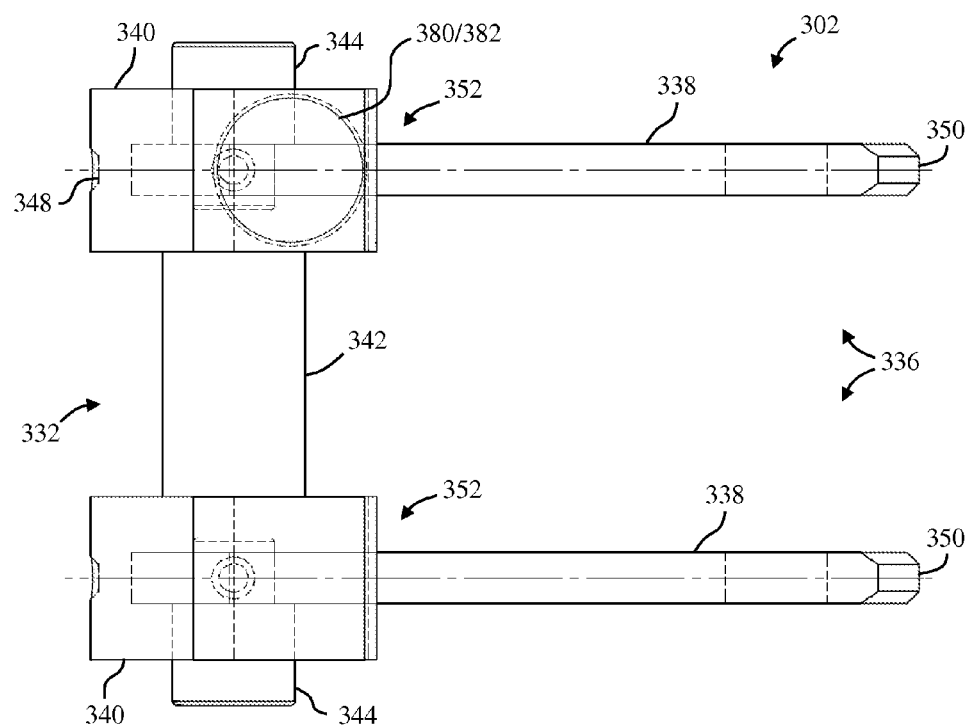
FIG. 24 is a top view of the first plug assembly shown in FIG. 21.
Figure 25:
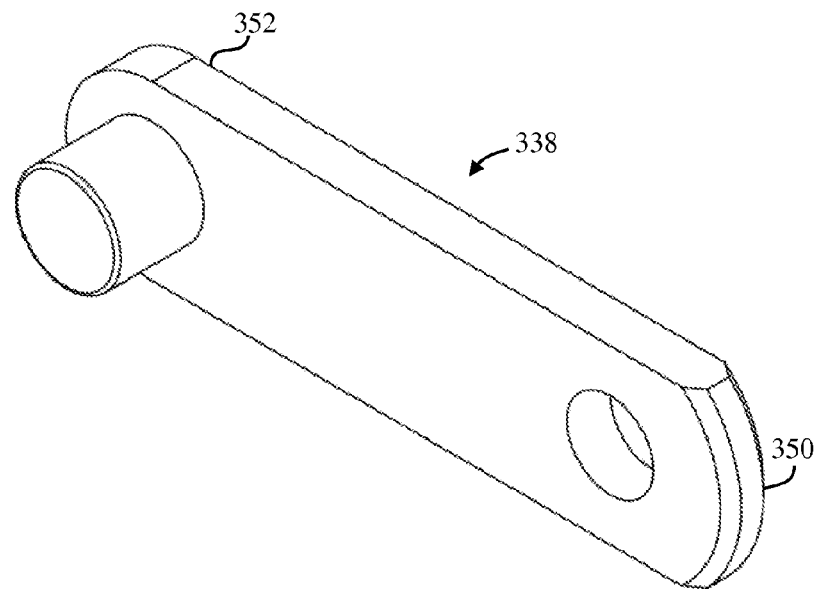
FIG. 25 is a isometric view of a prong that may be used with the first plug assembly shown in FIG. 21, according to an embodiment of the invention.
Figure 26:
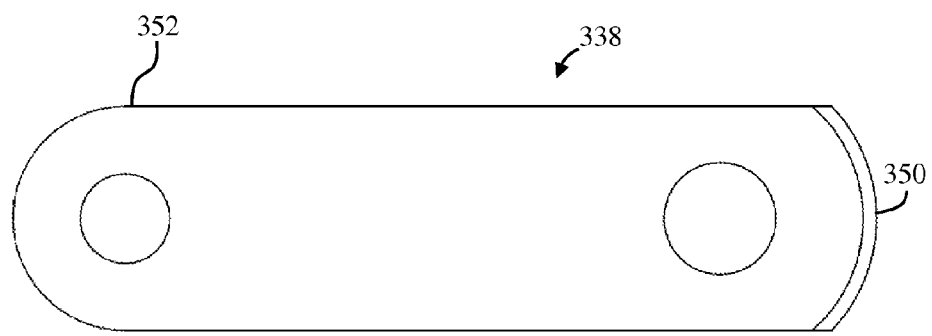
FIG. 26 is a side view of the prong shown in FIG. 25.
Figure 27:
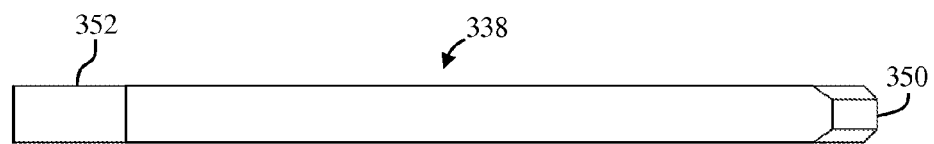
FIG. 27 is a top view of the prong shown in FIG. 25.
Figure 28:
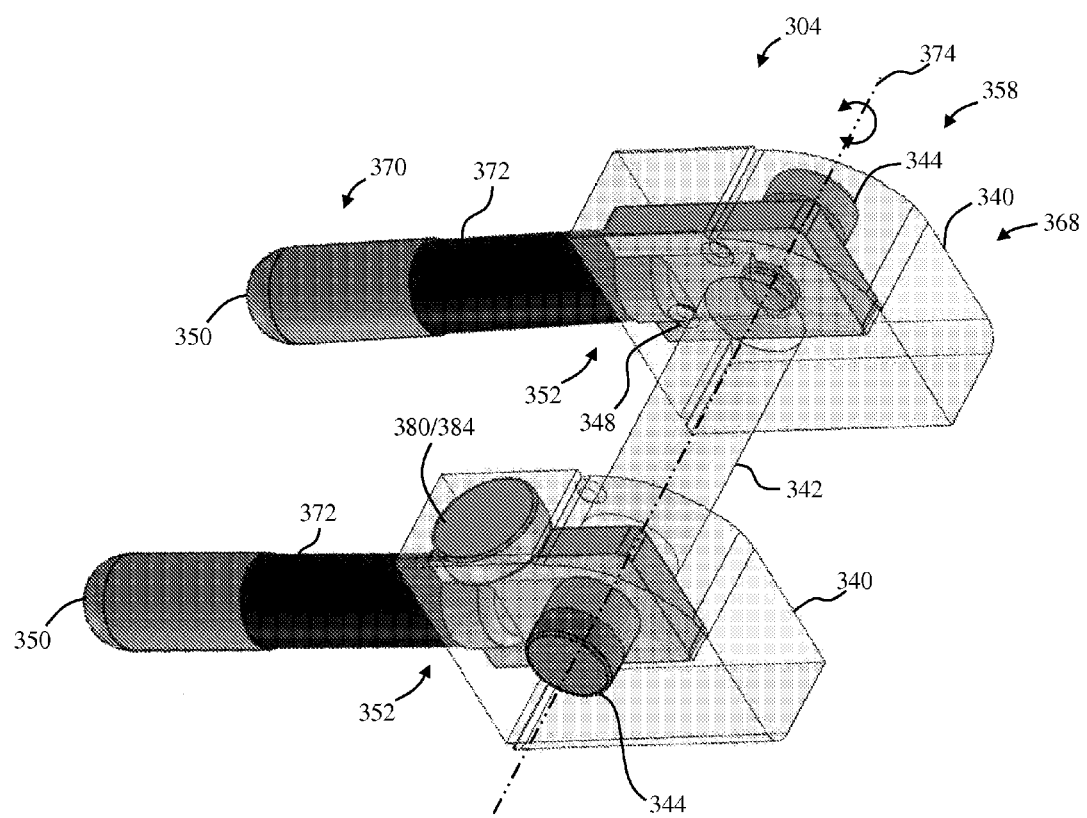
FIG. 28 is a schematic isometric view of a second plug assembly for use with the housing shown in FIG. 20, according to an embodiment of the present invention.
Figure 29:
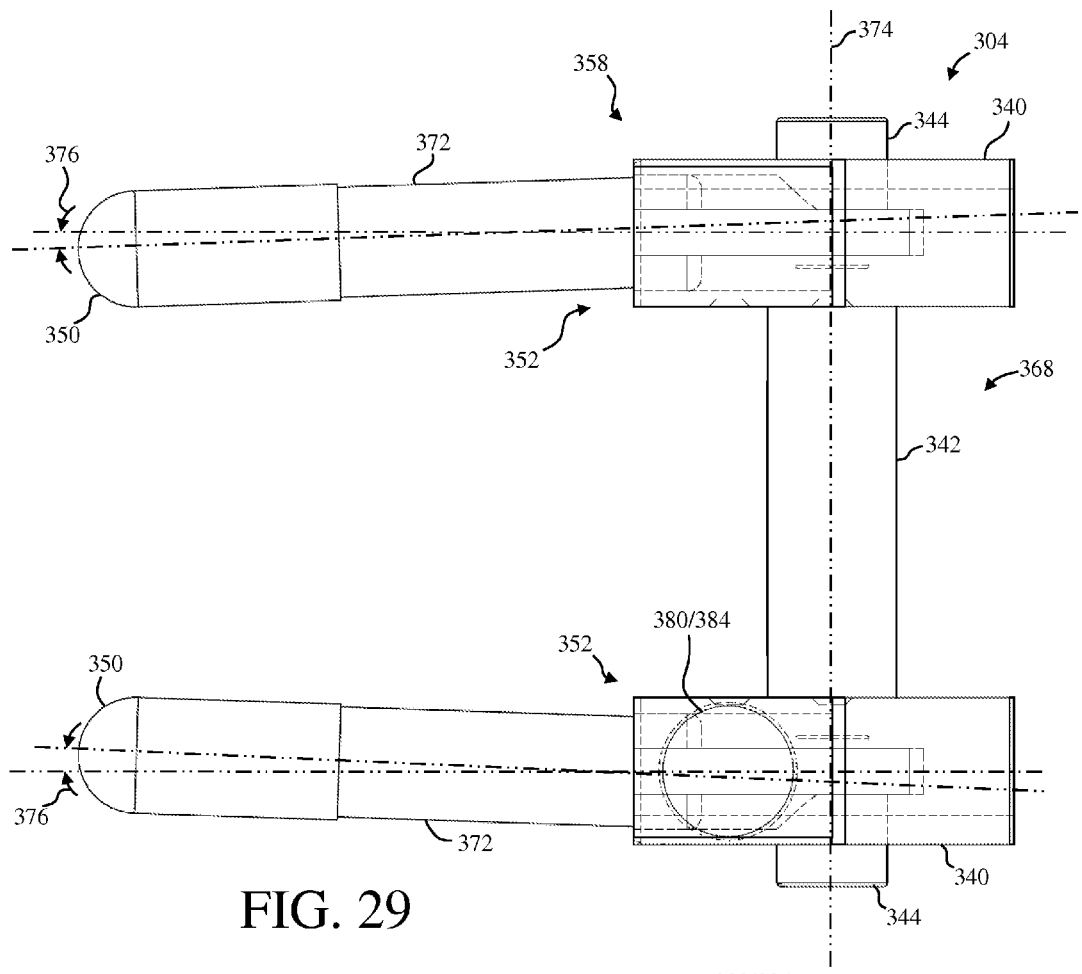
FIG. 29 is a top view of the second plug assembly shown in FIG. 28.
Figure 30:
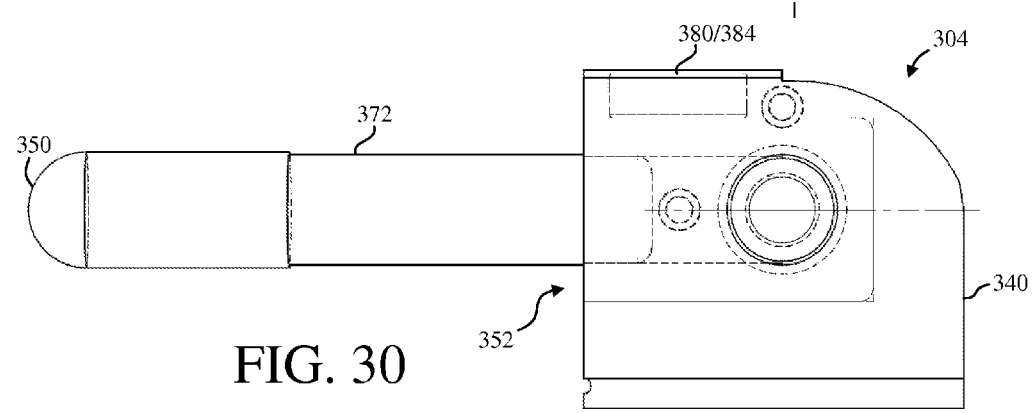
FIG. 30 is a side view of the second plug assembly shown in FIG. 28.
Figure 31:
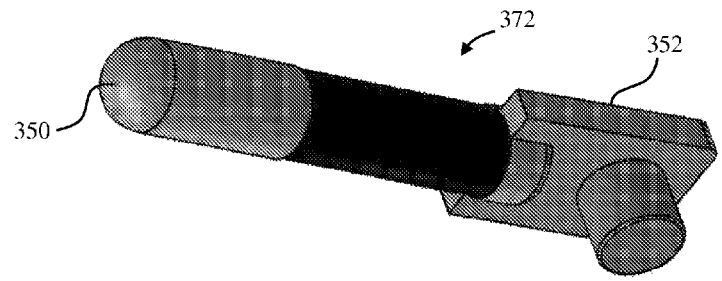
FIG. 31 is an isometric view of a prong that may be used with the second plug assembly shown in FIG. 28.
Figure 32:
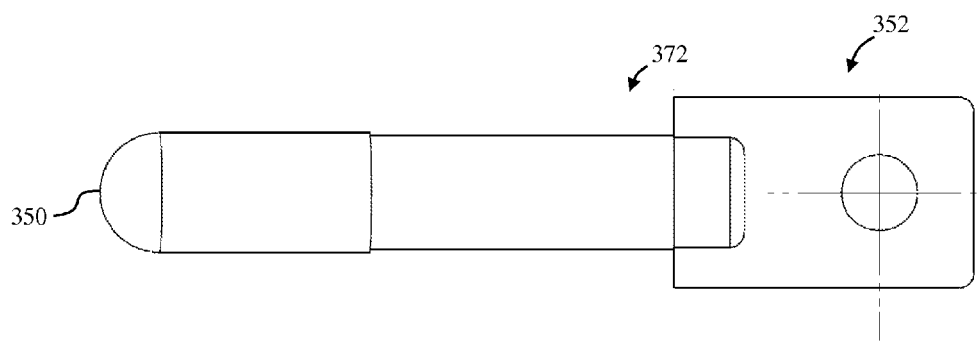
FIG. 32 is a side view of the prong shown in FIG. 29.
Figure 33:
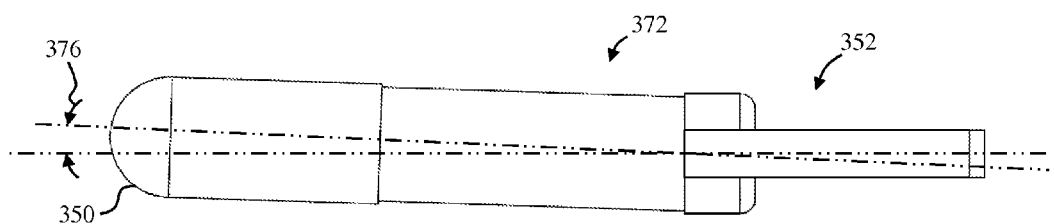
FIG. 33 is a top view of the prong shown in FIG. 29.
Figure 34:
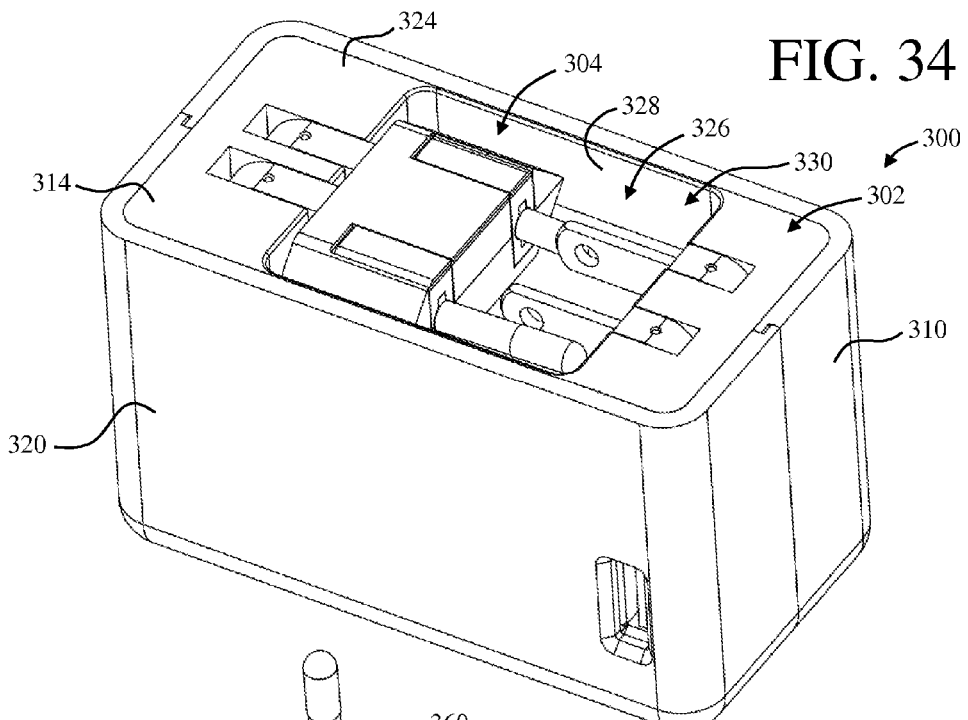
FIG. 34 is another isometric view of the housing shown in FIG. 20, according to an embodiment of the present invention.

FIGS. 20 and 34 are isometric views of another housing 300 that may be used with the power device 2. FIG. 21 is an isometric view of a first plug assembly 302 that may be used with the power device 2. FIG. 28 is an isometric view of a second plug assembly 304 that may be used with the power device 2. In the illustrated embodiment, the power device 2 includes the housing 300, a power circuit assembly 306 (shown in FIG. 1) that is positioned within the housing 300, the first plug assembly 302, and the second plug assembly 304. The power circuit assembly 306 includes the first power circuit 10 and/or the second power circuit 24. The first plug assembly 302 is coupled to the power circuit assembly 306 for transmitting power from the sourced electrical power 18 to the power circuit assembly 306 at a first power voltage. The second plug assembly 304 is coupled to the power circuit assembly 306 for transmitting power from the sourced electrical power 18 to the power circuit assembly 306 at a second power voltage that is different than the first power voltage. Moreover, the second plug assembly 304 is also configured to transmit power from the sourced electrical power 18 to the power circuit assembly 306 at a third power voltage that is different from the first power voltage and the second power voltage.

For example, in one embodiment, the first plug assembly 302 may include the first electrical plug 104A which is configured to channel power from a North American standard power outlet at a first voltage that is approximately equal to 120 volts. The second plug assembly 304 may include the second electrical plug 104B which is configured to channel power from a European standard power outlet at a second voltage that is approximately equal to 240 volts. In addition, the second plug assembly 304 may be configured to channel power from an Asian standard power outlet at a third voltage that is approximately equal to 230 volts. In another embodiment, the first plug assembly 302 and/or the second plug assembly 304 may be configured to meet any other power outlet standard such as the Australian standard power outlet and voltage.

Figure 35:
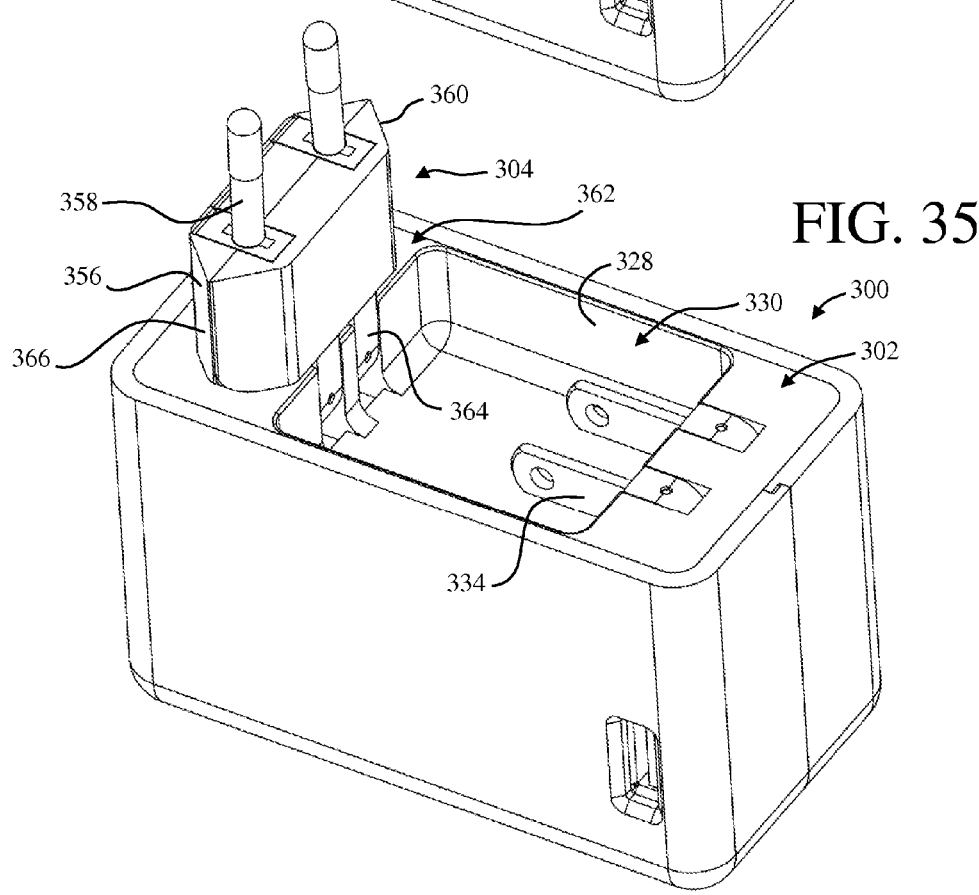
FIGS. 35-38 are isometric views of the housing shown in FIG. 34, according to an embodiment of the present invention.
Figure 36:
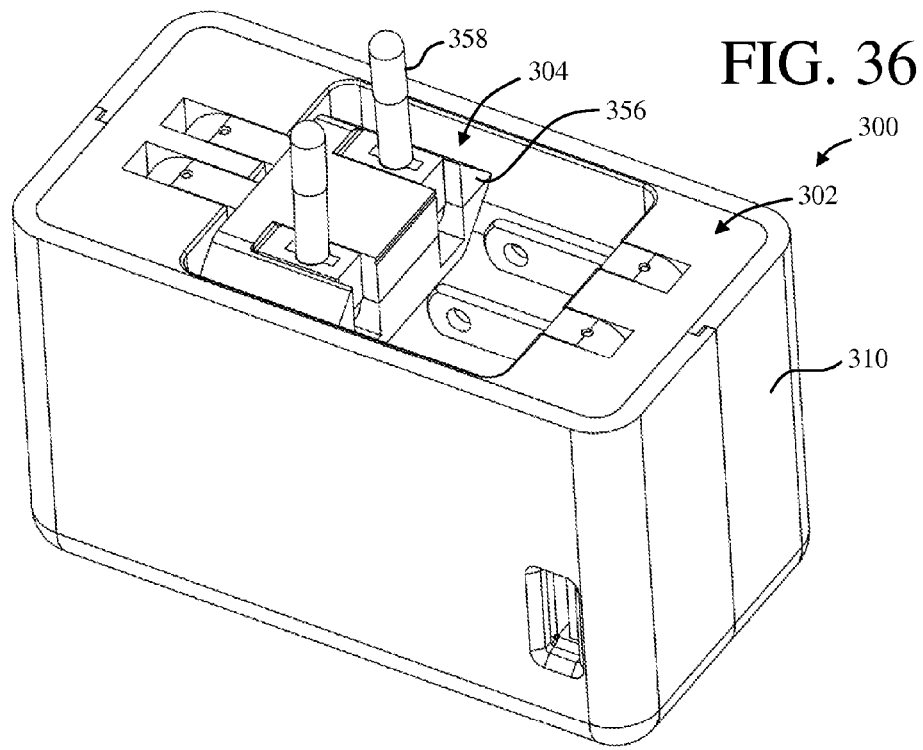
Figure 37:
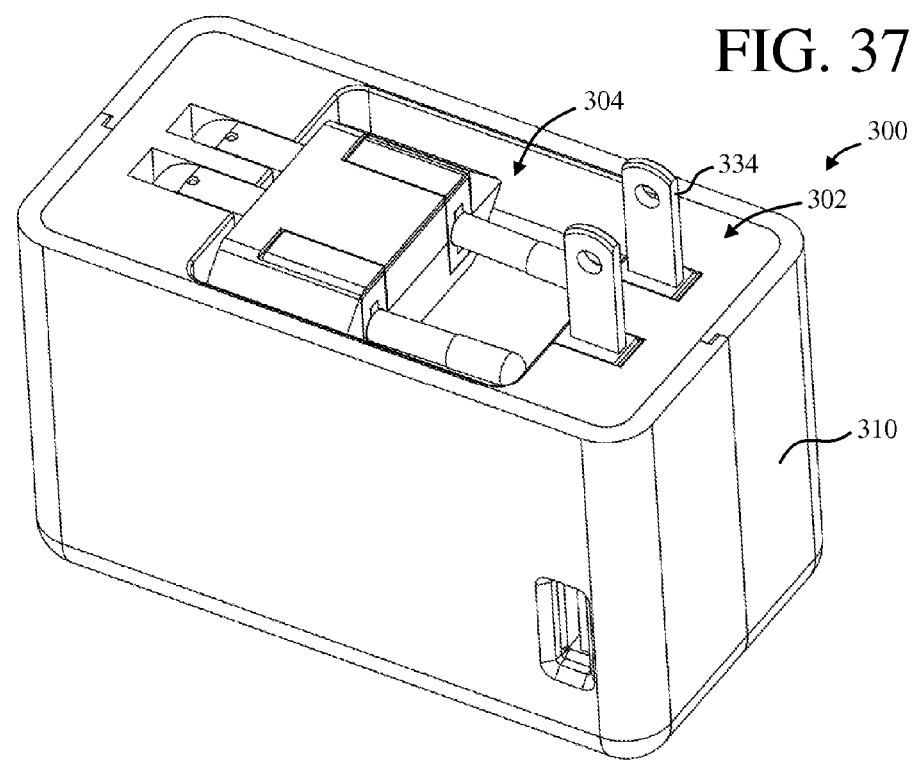
Figure 38:
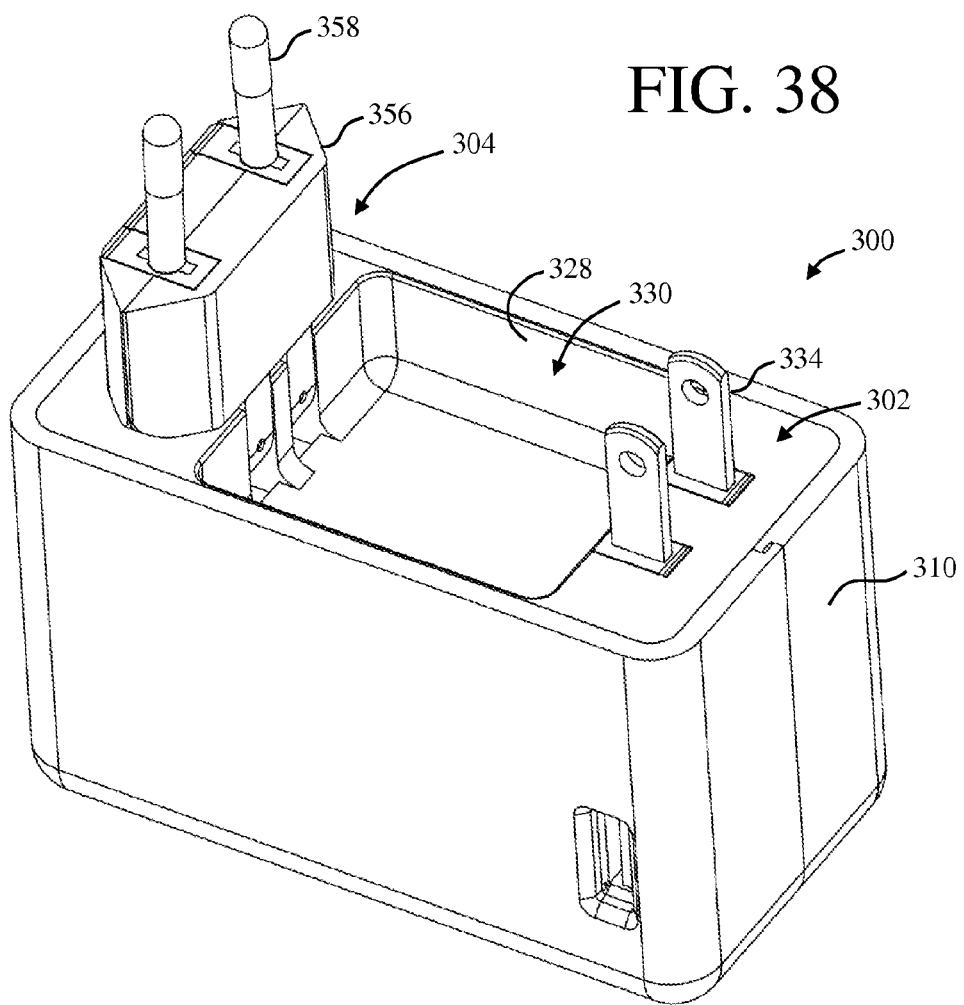

In the illustrated embodiment, the power device 2 is operable between a first operating mode (shown in FIG. 37), a second operating mode (shown in FIG. 36), a third operating mode (shown in FIG. 35), and a fourth operating mode (shown in FIG. 38). In the first operating mode, the power device 2 is adapted to receive power from the sourced electrical power 18 at the first voltage. More specifically, in the first operating mode, the first plug assembly 302 channels power from the sourced electrical power 18 to the power circuit assembly 306 at the first voltage. In the second operating mode, the power device 2 is adapted to receive power from the sourced electrical power 18 at the second voltage via the second plug assembly 304. In the third operating mode, the power device 2 is adapted to receive power from the sourced electrical power 18 via the second plug assembly 304 at the third voltage. In the fourth operating mode, the power device 2 operates in a "fault" mode and is adapted to not receive power from the first plug assembly 302 and the second plug assembly 304 such that power circuit assembly 306 cannot receive power from the sourced electrical power 18. The fault mode prevents hazardous conditions from occurring in the case of a user connecting the system via an extension cord or similar device that would allow the user to touch the unconnected plug which might be exposed through such use.

In the illustrated embodiment, the first plug assembly 302 is positionable between a first plug first position (shown in FIG. 37) and a first plug second position (shown in FIGS. 20 and 34). In the first plug first position, the first plug assembly 302 is adapted to be connected to a first power source outlet (not shown) of the sourced electrical power 18. In the first plug second position, the first plug assembly 302 is adapted to be disconnected from the first power source outlet. For example, in the illustrated embodiment, the first power source outlet is a North America standard power outlet. In the first plug first position, the first plug assembly 302 is adapted to be inserted into the North America standard power outlet to channel power from the sourced electrical power 18 to the power circuit assembly 306. In the first plug second position, the first plug assembly 302 is orientated such that the first plug assembly 302 is prevented from being inserted into the power outlet. In an alternative embodiment, the first power source outlet may be a European standard power outlet, an Asian standard power outlet, an Australian standard power outlet, and/or any suitable power outlet to enable the power device 2 to function as described herein.

In the illustrated embodiment, the second plug assembly 304 is positionable between a first position (shown in FIGS. 20 and 36), a second position (shown in FIG. 35), and a third position (shown in FIG. 34). In the second plug first position, the second plug assembly 304 is adapted to be connected to a second power source outlet (not shown) of the sourced electrical power 18 to deliver power from the sourced electrical power 18 to the power circuit assembly 306. In the second plug second position, the second plug assembly 304 is adapted to be connected to third power source outlet (not shown) of the sourced electrical power 18 to channel power from the sourced electrical power 18 to the power circuit assembly 306. In the second plug third position, the second plug assembly 304 is adapted to be disconnected from the second power source outlet and the third power source outlet. For example, in the illustrated embodiment, the second power source outlet is an Asian standard power outlet and the third power source outlet is an European standard power outlet. In the second plug first position, the second plug assembly 304 is adapted to be inserted into the Asian standard power outlet to channel power from the sourced electrical power 18 to the power circuit assembly 306. In the second plug second position, the second plug assembly 304 is adapted to be inserted into the European standard power outlet to channel power from the sourced electrical power 18 to the power circuit assembly 306. In the second plug third position, the second plug assembly 304 is orientated such that the second plug assembly 304 is prevented from being inserted into the European standard power outlet and/or the Asian standard power outlet. In an alternative embodiment, the second power source outlet and/or the third power source outlet may be a North American standard power outlet, a European standard power outlet, an Asian standard power outlet, an Australian standard power outlet, and/or any suitable power outlet to enable the power device 2 to function as described herein.

In the illustrated embodiment, the power device 2 is adapted to operate in the first operating mode with the first plug assembly 302 in the first plug assembly first position and the second plug assembly in the second plug assembly third position. In addition, the power device 2 is adapted to in the second operating mode with the second plug assembly 304 in the second plug assembly first position and the first plug assembly 302 in the first plug assembly second position. Moreover, the power device 2 operates in the third operating mode with the second plug assembly 304 in the second plug assembly second position and the first plug assembly 302 in the first plug assembly second position. In addition, the power device 2 operates in the fourth operating mode with the first plug assembly 302 in the first plug assembly first position and the second plug assembly in the second plug assembly first position and/or the second plug assembly second position.

In the illustrated embodiment, the power device 2 includes a display device 308 (shown in FIG. 14) including the three separate LED circuits 132A, 132B, 132C. The display device 308 is adapted to display a first notification signal such as, for example, illuminating the first plug assembly 302, with the power device 2 operating in the first operating mode, and to display a second notification signal such as, for example, illuminating the second plug assembly 304, with the power device 2 operating in the second operating mode and/or the third operating mode. In one embodiment, each notification signal may include a predefined illuminated color, a predefined flashing sequence, and/or any suitable illumination color, brightness, flashing frequency that enables the power device 2 to function as described herein.

With reference to FIG. 20, in the illustrated embodiment, the housing 300 includes an outer surface 310 and an inner surface 312 that defines a cavity 314 therein. The housing 300 also includes a top wall 316, an opposite bottom wall 318, and a sidewall 320. The sidewall 320 extends between the top wall 316 and the bottom wall 318 along a longitudinal axis 322. In the illustrated embodiment, the top wall 316 includes a substantially planar outer surface 324. Alternatively, the top wall outer surface 324 may have an arcuate and/or curved shape. In the illustrated embodiment, the top wall 316 includes a recessed portion 326 that is defined along the top wall outer surface 324. The recessed portion 326 includes an interior surface 328 that extends inwardly from the top wall outer surface 324 towards the bottom wall 318 and defines a chamber 330 that is sized and shaped to receive the first plug assembly 302 and the second plug assembly 304 therein. In the illustrated embodiment, the first and second plug assemblies 302 and 304 may be positioned within the recessed portion 326 such that the first and second plug assemblies 302 and 304 are substantially flush with the top wall outer surface 324.

FIGS. 21-27 are various views of the first plug assembly 302. In the illustrated embodiment, the first plug assembly 302 is pivotably coupled to the housing top wall 316 and is positionable between the first plug first position, i.e. an extended position (shown in FIG. 37), and the first plug second position, i.e. a retracted position (shown in FIGS. 20 and 34). The first plug assembly 302 includes a mounting assembly 332 and a first prong assembly 334 that is coupled to the mounting assembly 332. The first prong assembly 334 includes a pair 336 of first prongs 338 that extend outwardly from the mounting assembly 332. The mounting assembly 332 includes a pair of mounting brackets 340 and a support rod 342 that is coupled between the mounting brackets 340. The first plug assembly 302 also includes at least one mounting pin 344 that is coupled between the housing top wall 316 and at least one of the mounting brackets 340 to couple the first plug assembly 302 to the housing top wall 316. The mounting pin 344 enables the first plug assembly 302 to pivot about a pivot axis 346 such that the first plug assembly 302 may be moved between the extended and retracted positions. In addition, at least one of the mounting brackets 340 includes a plurality of detent holes 348 that are arranged along an outer surface of the mounting bracket 340 to facilitate positioning the first plug assembly 302 in the extended position and the retracted position.

Each first prong 338 extends between a tip end 350 and a base end 352. The base end 352 is coupled to the respective mounting bracket 340 and the prong tip end 350 extends outwardly from the mounting bracket 340. The pair 336 of first prongs 338 are orientated substantially parallel with each other. In the extended position, the pair 336 of first prongs 338 are orientated such that the prong tip ends 350 extend outwardly a distance from the housing outer surface 310 and towards the power source outlet. Moreover, in the extended position, the first prongs 338 are substantially parallel with the longitudinal axis 322 to enable the first prongs 338 to be inserted into the power source outlet. In the retracted position, the first prongs 338 are orientated such that the prong tip ends 350 are adjacent to the housing outer surface 310. Moreover, the first prongs 338 are orientated along a transverse axis 354 that is substantially perpendicular to the longitudinal axis 322 and are positioned within the chamber 330 to facilitate preventing the first plug assembly 302 from being inserted into the power source outlet.

FIGS. 28-33 are various views of the second plug assembly 304. In the illustrated embodiment, the second plug assembly 304 is pivotably coupled to the housing top wall 316 and is positionable between the second plug first position, i.e. a first extended position (shown in FIGS. 20 and 36), the second plug second position, i.e. a second extended position (shown in FIG. 35), and the second plug third position, i.e. a retracted position (shown in FIG. 34). With reference to FIGS. 20 and 28-33, the second plug assembly 304 includes a base member 356 that is pivotably coupled to the housing top wall 316 and a second prong assembly 358 that is pivotably coupled to the base member 356. The base member 356 extends between a top portion 360 and a bottom portion 362. The bottom portion 362 includes a pair of support arms 364 that extend outwardly from the base member 356 and are coupled to the housing top wall 316 such that that the base member 356 is movable with respect to the housing outer surface 310. In the illustrated embodiment, the base member 356 includes an outer surface 366 having a shape that enables the base member 356 to be at least partially inserted into a power source outlet such as, for example, a European standard power outlet.

The second prong assembly 358 is pivotably coupled to the base member top portion 360 and includes a mounting assembly 368 and a pair 370 of second prongs 372 that extend outwardly from the mounting assembly 368. The mounting assembly 368 includes a pair of mounting brackets 340 and a support rod 342 that is coupled between the mounting brackets 340. The mounting assembly 368 also includes at least one mounting pin 344 that is coupled between the base member top portion 360 and the second prong assembly 358 to couple the second prong assembly 358 to the base member 356 such that the second prong assembly 358 is movable with respect to the base member 356. Moreover, the mounting pin 344 enables the second prong assembly 358 to pivot about a pivot axis 374 such that the second prong assembly 358 may be moved between the first extended position and the retracted position. In addition, at least one of the mounting brackets 340 includes a plurality of detent holes 348 that are arranged along an outer surface of the mounting bracket 340 to facilitate positioning the second prong assembly 358.

Each second prong 372 extends between a tip end 350 and a base end 352. The base end 352 is coupled to the respective mounting bracket 340 and the prong tip end 350 extends outwardly from the mounting bracket 340. At least one of the second prongs 372 extends outwardly at an oblique angle 376 from the mounting bracket 340 such that the second prongs converge at the tip ends 350.

In the first extended position (shown in FIGS. 20 and 36), the base member 356 is positioned within the chamber 330 and the pair 370 of second prongs 372 are orientated such that the prong tip ends 350 extend outwardly a distance from the housing outer surface 310 and towards the power source outlet. Moreover, in the first extended position, the second prongs 372 are substantially parallel with the longitudinal axis 322 to enable the second prongs 372 to be inserted into the power source outlet. In addition, the base member 356 is substantially parallel with the transverse axis 354 such that the second prongs 372 are orientated substantially perpendicular to the base member top portion 360.

In the second extended position (shown in FIG. 35), the base member 356 extends outwardly from the housing outer surface 310 and towards the power source outlet and is orientated along the longitudinal axis 322. In addition, the second prongs 372 extend outwardly from the base member top portion 360 such that the second prongs 372 are aligned with the base member 356 and are also orientated along the longitudinal axis 322 such that the base member 356 and the second prongs 372 extend outwardly from the housing 300 and towards the power source outlet. In the first extended position, the second plug assembly 304 is orientated to be inserted into a first power source outlet such as, for example, a Asian and/or French standard power outlet. In the second extended position, the second plug assembly 304 is orientated to be inserted into a second power source outlet such as, for example, a European standard power outlet that is different than the first power source outlet.

In the retracted position, the base member 356 is positioned within the chamber 330 and the second prong tip ends 350 are positioned adjacent the housing outer surface 310. Moreover, the base member 356 and the second prongs 372 are orientated along the transverse axis 354 and are each positioned within the chamber 330 to facilitate preventing the second plug assembly 304 from being inserted into the first and/or second power source outlets.

In the illustrated embodiment, the pair 370 of second prongs 372 a spaced a distance apart such that the pair 336 of first prongs 338 may be positioned between each of the second prongs 372 with the first plug assembly 302 and the second plug assembly 304 in the retracted positions such that the first and second plug assemblies 302 and 304 are flush with the housing outer surface 310.

Figure 39:
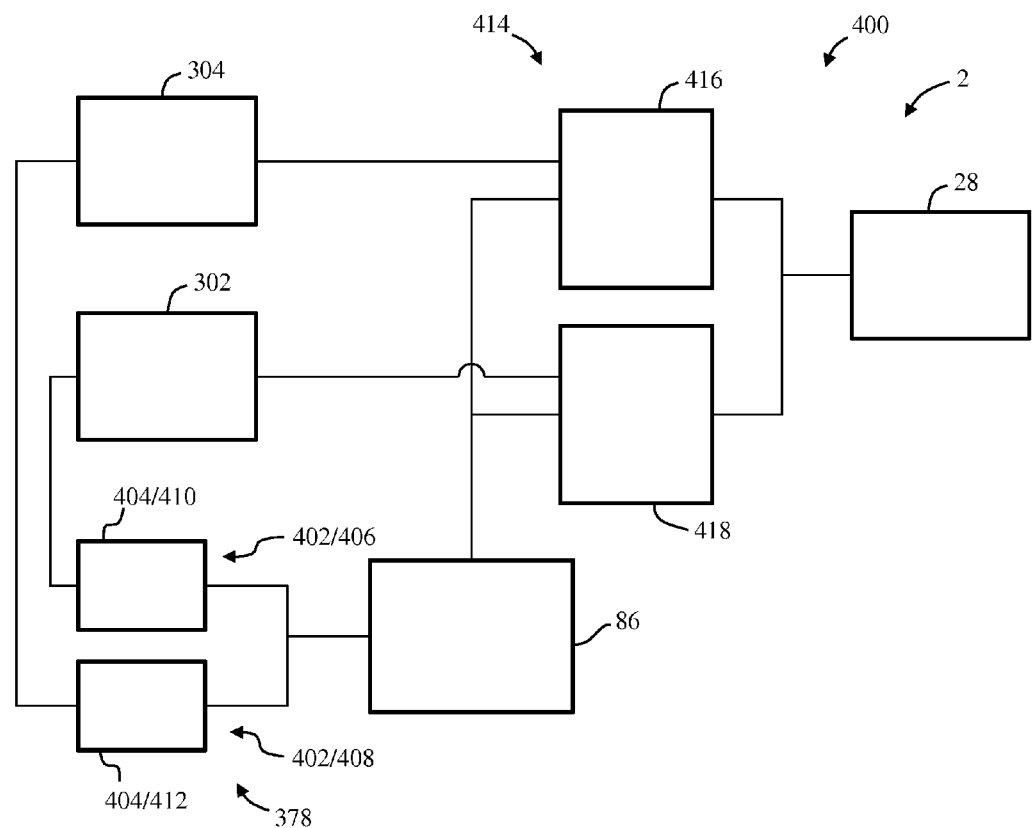
FIG. 39 is a schematic view of a power cut-off assembly that may be used with the power circuit shown in FIG. 1, according to an embodiment of the present invention.
Figure 40:
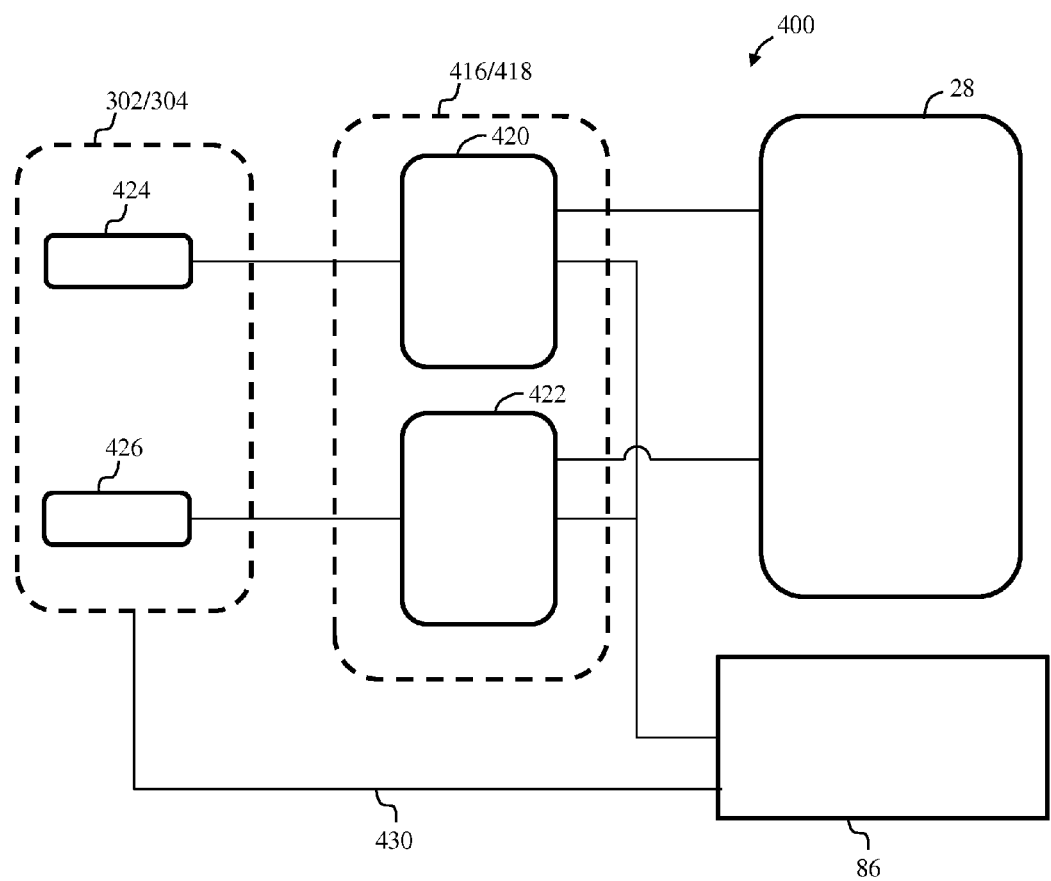
FIG. 40 is another schematic view of a power cut-off assembly that may be used with the power circuit shown in FIG. 1, according to an embodiment of the present invention.
Figure 41:
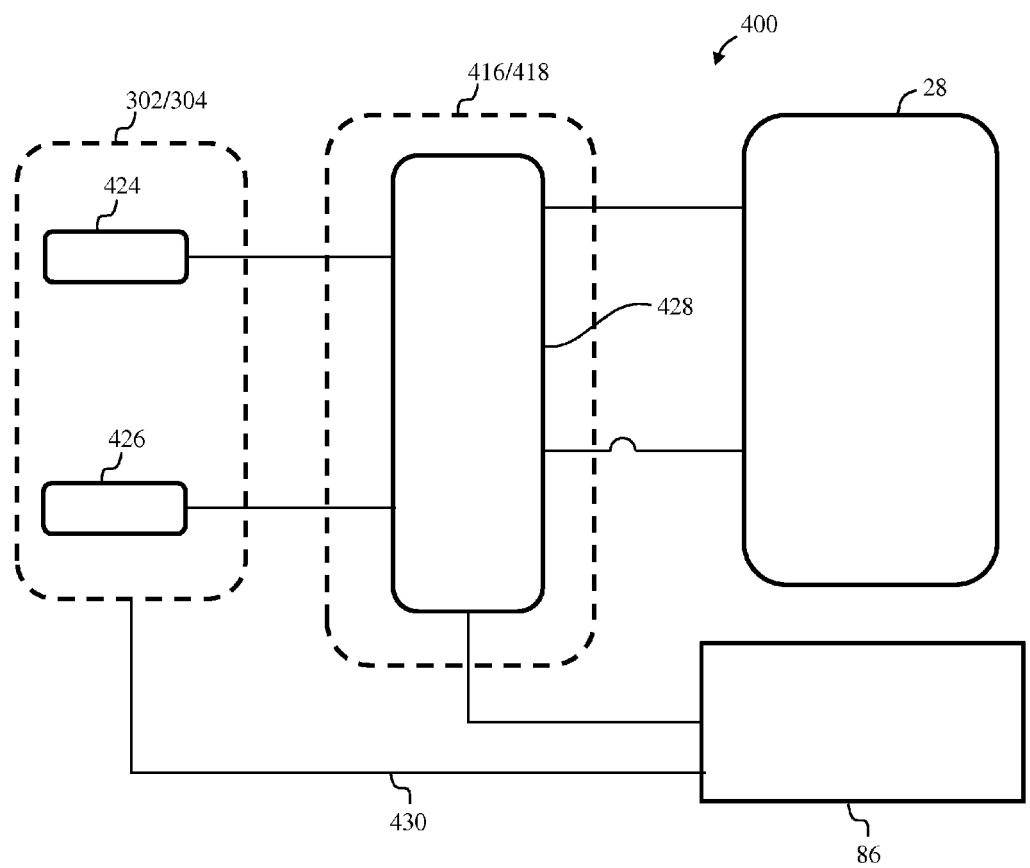
FIG. 41 is another schematic view of a power cut-off assembly that may be used with the power circuit shown in FIG. 1, according to an embodiment of the present invention.

FIG. 39 is a schematic view of a power cut-off assembly 400. FIG. 40 is another schematic view of the power cut-off assembly 400. FIG. 41 is another schematic view of the power cut-off assembly 400. In the illustrated embodiment, the power device 2 also includes the power cut-off assembly 400 for use in preventing power from being transmitted from the first and second plug assemblies 302 and 304 to the power circuit assembly 306. In the illustrated embodiment, the power cut-off assembly 400 includes a sensing assembly 378 (shown in FIGS. 20 and 39) that is adapted to sense a position of the first plug assembly 302 and a position of the second plug assembly 304, and transmit a signal indicative of the sensed positions to the microprocessor 86. In the illustrated embodiment, the sensing assembly 378 includes at least one sensing device 402 that includes one or more magnets 380 that are coupled to the first plug assembly 302 and the second plug assembly 304 and one or more Hall Effect sensors 404 for sensing a proximity of the first and second plug assemblies 302 and 304. More specifically, in the illustrated embodiment, the sensing assembly 378 includes a first sensing device 406 for sensing a position of the first plug assembly 302, and a second sensing device 408 for sensing a position of the second plug assembly 304. The first sensing device 406 includes a first sensor 410 and a first magnet 382 that is coupled to the first plug assembly 302. The second sensing device 408 includes a second sensor 412 and a second magnet 384 that is coupled to the second plug assembly 304. The Hall Effect sensors 410 and 412 operate by sensing the presence of a magnetic field that is generated by the magnets 380. As the first and second plug assemblies 302 and 304 are moved between the retracted positions and the extended positions, the Hall Effect sensors 410 and 412 are adapted to sense the relative strength of the magnetic fields generated by the first and second magnets 382 and 384, respectively, to determine a relative position of the first and second plug assemblies 302 and 304. In the illustrated embodiment, the Hall Effect sensors 410 and 412 are positioned near the interior surface 328 of the housing recessed portion 326, and each of the first and second magnets 382 and 384 are coupled to the mounting brackets 340 of the first and second plug assemblies 302 and 304, respectively. In another embodiment, the sensing assembly 378 may include any suitable sensing device for sensing the relative positions of the first and second plug assemblies 302 and 304.

In the illustrated embodiment, the power cut-off assembly 400 also includes an input power management system 414 that is coupled between first and second plug assemblies 302 and 304 and the input circuit 28 for selectively transmitting power from the first and second plug assemblies 302 and 304 to the input circuit 28. In the illustrated embodiment, the input power management system 414 includes a first input power disconnect assembly 416 and a second input power disconnect assembly 418. The first input power disconnect assembly 416 is connected between the first plug assembly 302 and the input circuit 28. The second input power disconnect assembly 418 is connected between the second plug assembly 304 and the input circuit 28. In addition, the microprocessor 86 is coupled to first and second input power disconnect assemblies 416 and 418, and to the sensing assembly 378 for detecting a position of the first and second plug assemblies 302 and 304, and operating the first and second input power disconnect assemblies 416 and 418 to selectively transfer power from the first and second plug assemblies 302 and 304 to the input circuit 28.

Referring to FIG. 40, in the illustrated embodiment, the first and second input power disconnect assemblies 416 and 418 each include a first TRIAC device 420 and a second TRIAC device 422. The first TRIAC device 420 is connected between a first prong 424 and the input circuit 28. The second TRIAC device 422 is connected between a second prong 426 and the input circuit 28. Each of the first and second TRIAC devices 420 and 422 operate between an "on" state wherein the first and second prongs 424 and 426 are electrically connected to the input circuit 28 and an "off" state wherein the first and second prongs 424 and 426 are electrically disconnected from the input circuit 28. In the illustrated embodiment, the default state for each of the first and second input power disconnect assemblies 416 and 418 is the "off" state. During operation, the microprocessor 86 senses a position of the first plug assembly 302 and selectively operates the first input power disconnect assembly 416 between the "on" state for delivering power to the input circuit 28 and the "off" state to prevent power form being deliver to the input circuit 28. Similarly, the microprocessor 86 senses a position of the second plug assembly 304 and selectively operates the second input power disconnect assembly 418 between the "on" state and the "off" state. In one embodiment, the first and second TRIAC devices 420 and 422 may include an Opti-TRIAC device.

Referring to FIG. 41, in one embodiment, the first and second input power disconnect assemblies 416 and 418 may each include an electrical relay 428 that is connected to the first and second prongs 424 and 426. Each electrical relay 428 is operable in the "on" state and the "off" state to selectively deliver power from the first and second prong assemblies 302 and 304, respectively, to the input circuit 28.

In the illustrated embodiment, the input power management system 414 also includes a boot-strap circuit 430 that is connected to the first and second plug assemblies 302 and 304 and the microprocessor 86 for delivering power to the microprocessor 86 for use during a boot-up or start-up mode of the microprocessor 86. The boot-strap circuit 430 is electrically connected to the hot-side of the first and second input power disconnect assemblies 416 and 418 for delivering a small amount of power from the respective plug assemblies 302 and 304 to the microprocessor 86 during start-up. In on embodiment, the boot-strap circuit 430 may be the second power circuit 24.

Power Input Management

The charger enclosure houses two self contained Power connectors; a USA plug and a European/Asian plug. This necessitates some management of the power Input connection in order to prevent the possibility of exposing a hazardous voltage to the user. Through the use of a bootstrapping system, the microprocessor can access power from either connector, as long as one of them is plugged in, while at the same time allowing both connectors to be unattached to the charger itself.

Through the use of Hall Effect devices and small magnets it is possible for the microprocessor to determine which of the included plugs is extended. This is due to the fact that a Hall Effect device operates by sensing the proximate presence of a magnetic field. This field is provided by small magnets embedded in the mountings of the plugs themselves. When the plugs are in the closed position, their respective Hall Effect devices sense their magnet and, therefore, knows that its plug is closed. If either plug is extended, its magnet is moved away from its respective Hall Effect device and, by this action, alerts the microprocessor of the extension.

There a four possible states of the two plugs. They are as follows:

[1.] Both plugs are closed. Since there is no available power the microprocessor is unaware of this state.

[2.] The USA plug is extended. The microprocessor is alerted to this state by the USA Hall Effect device.

[3.] The European/Asian plug is extended. The microprocessor is alerted to this state by the European/Asian Hall Effect device

[4.] Both plugs are extended. When the microprocessor sees this state, it considers it a "Fault" condition.

When either states 2 or 3 are present the microprocessor enables an Optotriac or relay to enable the connection of its respective power connector to the charging system and therefore allow battery charging to begin. State 1 is academic as there is no power available, while state 4 is considered a "Fault" condition and neither plug is connected. This prevents hazardous conditions from occurring in the case of a user connecting the system via an extension cord or similar device that would allow the user to touch the unconnected plug which might be exposed through such use.

INDUSTRIAL APPLICABILITY

In one aspect of the present invention, the power circuits 10, 24 are aimed at delivering a specified power output signal to an external device connected, e.g., through the USB port 22, 26. Most external devices do not require a pure direct current (DC) signal to operate correctly. Many external devices will work with a power signal that has a combination of alternating current (AC) and DC. The important consideration with a power output signal that has a combination of AC and DC is to not let the peak value exceed some limit. This limit is typically the value of a pure DC power output signal which is accomplished with this invention. For example: a USB device typically needs a 5V DC power signal. The limit is 5V so the peak value of the composite AC/DC signal cannot exceed 5V. To keep the power output signal from exceeding the limit, the control element will sense the peak value of the output power signal rather than the DC, or average, component. If there is no AC component, the peak value of the output power signal in the invention is equal to the DC component.

The power device 2 will supply a desired fixed voltage. For a given device, the desired voltage may be different. For example, for a cell phone, the desired voltage is typically 5 volts. The frequency of the output signals (from the microprocessor) is adjusted to always supply the target voltage. If a load requires more current, the frequency will increase so that the fixed output voltage stays in an acceptable range. For different device requiring different voltages, the power device 2 will output consecutively larger voltages and monitor the current. When a threshold current is being drawn from the power device 2, the microprocessor makes a threshold determination as to what voltage the output should be controlled, e.g., 5 volts, 9 volts, 12 volts or up to 19.6 volts for devices like notebooks and/or laptops.

In another aspect of the present invention, a battery and/or charging capacitor (supercap 98) may be used as a power storage device to power the microprocessor 86. Also, current as regulated from the feedback loop may be delivered to the microprocessor, avoiding the need for an initial power supply for the microprocessor. It is desirable to keep the microprocessor on through either a electricity source supply or charged by the supercap 98 and/or battery at all times such that the application of loads, i.e., devices, may be detected and their state of charge to begin a charging cycle. During normal charging operation, power is diverted from one of the charging outputs to provide power to charge the supercap 98 and/or battery. In the case when the power device 2 is either first utilized or has been inactive for a period of time, a bootstrap power supply may be temporarily activated to supply the initial power. Once the supercap 98 and/or battery has been charged, the bootstrap power supply may be turned off.

In another aspect of the present invention, the power device 2 eliminates vampire loads. The microprocessor 86 and feedback loop continually monitor the draw of current from the charging device. From the initiation of the charging cycle, a table is formed in the microprocessor 86 which analyzes the current draw. During the charging cycle the microprocessor 86 continues to monitor the current draw that is being consumed by the charging device through the current sensor resistor 78. The microprocessor 86 then analyzes that draw and reports when the draw begins to wane due to a fully charged device. The microprocessor 86 also stands on alert to sense when the current diminishes as the charging device approaches a full charge. From the initial outrush of current to the charging device through the entire charging cycle, the microprocessor 86 uses algorithms to determine when a charging device is fully or nearly fully charged (and when the current draw approaches zero). Then, the power device 2 shuts off power from its inrush supply and shuts down the charging and power draw from the inrush source. Also, the power device 2 can detect when a device is connected by sensing the current draw. At any time when there is no current draw, the power device shuts off, avoiding the ongoing electrical waste that normally exist when a charging device is still plugged into a wall outlet, but no phone is attached.

In the illustrated embodiment, the first power block or input circuit 28 is connected to the mains, i.e., the sourced electrical power 18, which consist of either 120 volts at a frequency of 60 Hertz (the North American Standard) or 220-240 volts at a frequency of 50 Hz (the European Standard). This power is supplied to a full wave bridge 30 which rectifies the AC into pulsating DC. This pulsating DC is converted into a continuous DC voltage through the use of the capacitors 36 and 38 and the inductor 32. The DC voltage supplied is approximately 180V DC in the case of the North American Standard or approximately 360V DC in the case of the European Standard.

The charging delivery system starts with the microprocessor 86 which delivers high frequency square waves via four ports. These signals are fed through isolator devices 88 and 90 to their respective FET driver sub assemblies 50A, 50B. In the case of sub assembly 50A a signal from the highside isolator 90 is supplied to an FET 62 via its gate. The purpose of the FET 62 is to increase the voltage swing of the square wave from logic levels (3.3V peak to peak) to a voltage level of about 15V peak to peak required to drive the power FET 42 the first driver circuit 50A also contains lowside driver FETs these FETs are supplied from the lowside isolator 88 which is injected into the first isolator's gate 56. This signal is amplified and inverted and then fed in to a subsequent FET 58. This signal is also amplified and then inverted to create a 15V peak to peak signal suitable for driving respective power FET 44.

The two power FETs 42, 44 are set up as a "Totem Pole" configuration. The top of the "Totem Pole" 42 is fed with the DC voltage supplied from the input circuit 28. The bottom FET 44 has its source attached to ground. This arrangement allows for the "Totem Pole" junction 52 to deliver the square waves supplied by circuit 50A with a peak to peak value of 180V in the case of the North American Standard or a peak to peak value of 360V in the case of the European Standard.

Circuits 50B, 40B function identically to circuits 50A, 40A as described above with the exception that the delivered square wave at 54 is 180 degrees out of phase with the square wave at 52.

These two square waves are fed into the frequency dependent reactive device which contains a full wave bridge that is supplied by signal 52 via capacitor 70A. The bottom side of the bridge is fed signal 54 via the capacitor 70B. Capacitors 70A and 70B are sized (capacitance value) to reduce the AC voltage output from the large peak to peak input (180V to 360V peak to peak) to a more manageable voltage in the neighborhood of 10 VAC. The rectified output of bridge 74 is fed into the output circuit 16. This output circuit consists of conductor 76 and capacitor 80 which converts the pulsating DC from bridge 74 into an unregulated DC voltage.

The balance of circuit 16 consists of a voltage sense assembly consisting of resistors 82 and 84 and a current sense resistor 78. The voltage sense assembly delivers a representation of the output voltage (that voltage which is delivered to the charging device) to one of the microprocessor's A/D convertors. The sense resistor 78 delivers a voltage that is a representation of the current that is being consumed by the charging device. This signal is supplied to another A/D convertor within the microprocessor. These signals enable the microprocessor to adjust the output voltage to a precise 5 VDC regardless of the current requirements of the charging device.

Figure 19:
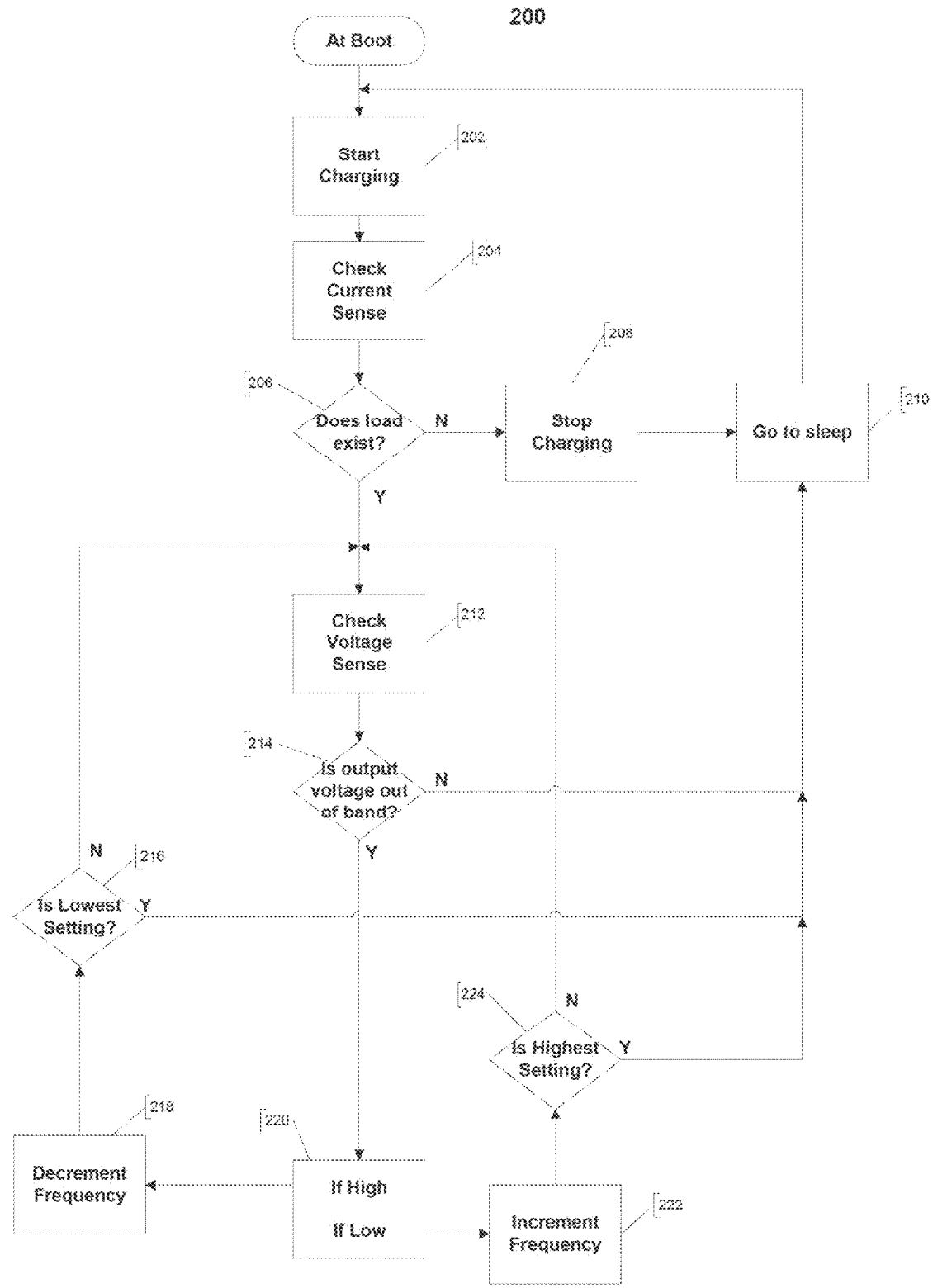
FIG. 19 is a flow diagram illustrating aperture of the power current of FIG. 1, according to an embodiment of the present invention.

With reference to FIG. 19, a boot time method 200 is shown. At boot time, the system initializes a charging routine at block 202. The microprocessor 86 then checks the current sense at block 204 to see if a load exists (block 206). If it does not, the microprocessor 88 turns off the charging routine (block 208) and enters a sleep period (block 210). After the sleep period the method 200 returns to the charging routine (block 202). The method 200 will stay in this loop as long as no load exists.

In the event that a load does exist (block 206) the method 200 checks the voltage sets (block 212). The system then compares what it reads with the acceptable in band voltage (block 214). If the voltage is not out of band the routine goes to sleep (block 210). If the voltage is out of band (block 214), the routine then checks if it is too high or too low (block 220).

If the voltage is too high the system decrements the output frequency (block 218) and then checks if the output frequency is at the lowest allowable setting (block 216). If yes, the routine goes to sleep (block 210). If no, the microprocessor once again checks the voltage sense (block 212). The microprocessor 86 will continue this loop until the output voltage has been reduced to the desired amount or it reaches the lowest allowable setting.

If the voltage is too low, the microprocessor 86 increments the output frequency (block 222) and then checks if the output frequency is at the highest allowable setting (block 224). If yes, the routine goes to sleep (block 210). If no, the method 200 once again checks the voltage sense (block 212). The method 200 will continue this loop until the output voltage has been increased to the desired amount or it reaches the highest allowable setting.

Many modifications and variations of the present invention are possible in light of the above teachings. The invention may be practiced otherwise than as specifically described within the scope of the appended claims.

What is claimed is:

1. A power device, comprising:
a power circuit assembly;
a first plug assembly coupled to the power circuit assembly, the first plug assembly for transmitting power from a power source to the power circuit assembly at a first voltage;
a second plug assembly coupled to the power circuit assembly, the second plug assembly for controllably transmitting power from a power source to the power circuit assembly at a second voltage and at a third voltage; and
a sensing assembly coupled to the power circuit assembly, the first plug assembly, and the second plug assembly, the sensing assembly for sensing a position of the first and second plug assemblies and transmitting a signal indicative of the sensed position to the power circuit assembly.

2. A power device in accordance with claim 1, wherein the power device is operable between a first operating mode wherein the first plug assembly transmits power to the power circuit assembly at the first voltage, a second operating mode wherein the second plug assembly transmits power to the power circuit assembly at the second voltage, and a third operating mode wherein the second plug assembly transmits power to the power circuit assembly at the third voltage.

3. A power device in accordance with claim 2, further comprising a display device, the display device for displaying a first notification signal with the power device in the first operating mode and a second notification signal with the power device in the second operating mode.

4. A power device in accordance with claim 2, wherein the first plug assembly is movable between a first position wherein the first plug assembly is orientated to be inserted into a first power source outlet, and a second position wherein the first plug assembly is not orientated to be inserted into the first power source outlet.

5. A power device in accordance with claim 4, wherein the second plug assembly is movable between a first position wherein the second plug assembly is orientated to be inserted into a second power source outlet, a second position wherein the second plug assembly is orientated to be inserted into a third power source outlet, and a third position wherein the second plug assembly is not orientated to be inserted into the second and third power source outlets.

6. A power device in accordance with claim 5, wherein the power device adapted to operate in the first operating mode with the first plug assembly in the first plug assembly first position, to operate in the second operating mode with the second plug assembly in the second plug assembly first position, and to operate in the third operating mode with the second plug assembly in the second plug assembly second position.

7. A power device in accordance with claim 6, wherein the power device is adapted to operate in a fourth operating mode with the first plug assembly in the first plug assembly first position and the second plug assembly in at least one of the second plug assembly first position and the second plug assembly second position, the power circuit assembly being adapted to prevent power from being received from the first and second plug assemblies in the fourth operating mode.

8. A power device, comprising:
   a housing comprising an outer surface and an inner surface, the inner surface defining a cavity therein;
   a power circuit assembly positioned with the housing cavity;
   a first plug assembly pivotably coupled to the housing, the first plug assembly for transmitting power from a power source to the power circuit assembly at a first voltage;
   a second plug assembly pivotably coupled to the housing, the second plug assembly for transmitting power from the power source to the power circuit assembly at a second voltage and at a third voltage; and
   sensing assembly coupled to the power circuit assembly, the first plug assembly, and the second plug assembly, the sensing assembly for sensing a position of the first and second plug assemblies and transmitting a signal indicative of the sensed position to the power circuit assembly.

9. A power device in accordance with claim 8, wherein the housing outer surface includes a recessed portion that defines a chamber, the chamber configured to received the first and second plug assemblies therein.

10. A power device in accordance with claim 8, wherein the first plug assembly is positionable between an extended position wherein the first plug assembly is orientated to be inserted into a power source outlet, and a retracted position wherein the first plug assembly is not orientated to be inserted into the power source outlet.

11. A power device in accordance with claim 10, wherein the first plug assembly includes a pair of first prongs, each first prong of the pair of first prongs extending between a tip end and a base end, the prong tip ends extending outwardly a distance from the housing outer surface towards the power source outlet with the first plug assembly in the extended position, the prong tip ends positioned adjacent the housing outer surface with the first plug assembly in the retracted position.

12. A power device in accordance with claim 8, wherein the second plug assembly is positionable between a first extended position wherein the second plug assembly is orientated to be inserted into a first power source outlet, a second extended position wherein the second plug assembly is orientated to be inserted into a second power source outlet that is different than the first power source outlet, and a retracted position wherein the second plug assembly is not orientated to be inserted into the first and second power source outlets.

13. A power device in accordance with claim 12, wherein the second plug assembly comprises:
   a base member pivotably coupled to the housing, the base member extending between a top portion and a bottom potion, the bottom portion pivotably coupled to the housing such that the base member is movable with respect to the housing outer surface; and
   a second prong assembly pivotably coupled to the base member top portion such that the second prong assembly is movable with respect to the base member.

14. A power device in accordance with claim 13, wherein the second prong assembly comprises a pair of second prongs each second prong of the pair of second prongs extending between a tip end and a base end, the second prong base ends being pivotably coupled to the base member top portion.

15. A power device in accordance with claim 14, wherein the second prong tip ends extend outwardly a distance from the housing outer surface and the base member positioned adjacent the housing outer surface with the second plug assembly in the first extended position, the base member and the second prongs extending outwardly from the housing outer surface with the second plug assembly in the second extended position, and the second prong tip ends positioned adjacent the housing outer surface with the second plug assembly in the retracted position.

16. A power device in accordance with claim 15, wherein the base member comprises an outer surface having a shape that is configured to be at least partially inserted into the second power source outlet with the second plug assembly in the second extended position.

17. A power device in accordance with claim 14, wherein the pair of second prongs are spaced a distance apart such that the first plug assembly is positionable between each of the second prongs.

18. A power device in accordance with claim 8, wherein the housing further comprises a top wall, a bottom wall, and a sidewall extending between the top wall and the bottom wall, each of the first and second plug assemblies being pivotably coupled to the housing top wall.

* * * * *